US010392194B2

(12) United States Patent
Kanaris

(10) Patent No.: US 10,392,194 B2
(45) Date of Patent: Aug. 27, 2019

(54) CONVEYOR ROLLER SURFACE ARRANGEMENT

(71) Applicant: Alexander D. Kanaris, Richmond Hill (CA)

(72) Inventor: Alexander D. Kanaris, Richmond Hill (CA)

( * ) Notice: Subject to any disclaimer, the term of this patent is extended or adjusted under 35 U.S.C. 154(b) by 0 days.

(21) Appl. No.: 15/624,369

(22) Filed: Jun. 15, 2017

(65) Prior Publication Data

US 2018/0362257 A1 Dec. 20, 2018

(51) Int. Cl.

| | |
|---|---|
| ***B65G 23/02*** | (2006.01) |
| ***B65G 23/04*** | (2006.01) |
| ***B65G 23/06*** | (2006.01) |
| ***B65G 39/02*** | (2006.01) |
| ***B29C 73/10*** | (2006.01) |
| ***B29C 65/48*** | (2006.01) |
| ***B29C 65/00*** | (2006.01) |
| ***B29C 73/04*** | (2006.01) |
| *B29C 35/02* | (2006.01) |

(52) U.S. Cl.

CPC .............. *B65G 23/04* (2013.01); *B29C 65/48* (2013.01); *B29C 66/1222* (2013.01); *B29C 73/04* (2013.01); *B29C 73/10* (2013.01); *B65G 39/02* (2013.01); *B29C 35/0227* (2013.01); *B65G 2207/02* (2013.01)

(58) Field of Classification Search

None

See application file for complete search history.

(56) References Cited

U.S. PATENT DOCUMENTS

| | | | |
|---|---|---|---|
| 689,521 | A | 12/1901 | Titus |
| 3,354,735 | A | 11/1967 | Holz |
| 3,789,682 | A | 2/1974 | Holz |
| 4,284,409 | A | 8/1981 | Van Teslaar |
| 4,718,544 | A | 1/1988 | Herren |
| 4,821,871 | A | 4/1989 | Herren |
| 4,832,669 | A | 5/1989 | Holz |
| 5,934,447 | A | 8/1999 | Kanaris |
| 6,168,544 | B1 | 1/2001 | Barnes et al. |

(Continued)

*Primary Examiner* — Kavel Singh

(74) *Attorney, Agent, or Firm* — Boyle Fredrickson, S.C.

(57) ABSTRACT

A surface arrangement for a conveyor roller adapted for use in a conveyor system configured to support and move a conveyor medium, and a conveyor roller incorporating same. The surface arrangement has a cylindrical rotatable supporting surface, at least one shear stop member extending outwardly from the rotatable supporting surface, at least one lagging member positioned on the rotatable supporting surface, and a bond between the at least one lagging member and the rotatable supporting surface. The at least one lagging member is positioned on the rotatable supporting surface, with at least a portion of one end of the at least one lagging member abutting at least a portion of the side surface of the at least one shear stop member. The at least one shear stop member is adapted to resist movement of the at least one abutting lagging member in at least one direction along the circumference of the rotatable supporting surface to reduce a shear force exerted on the bond when the conveyor roller is in use. Methods of making and repairing the surface arrangement are also disclosed.

34 Claims, 16 Drawing Sheets

(56) References Cited

U.S. PATENT DOCUMENTS

| | | | | |
|---|---|---|---|---|
| 6,443,297 | B1 * | 9/2002 | Johnston | B65G 39/07 193/37 |
| 6,692,392 | B2 | 2/2004 | Finnegan et al. | |
| 6,766,900 | B2 | 7/2004 | Kanaris | |
| 6,837,364 | B2 | 1/2005 | Kanaris | |
| 6,938,754 | B2 | 9/2005 | Kanaris | |
| 7,204,359 | B2 | 4/2007 | Kanaris | |
| 7,228,952 | B2 | 6/2007 | Kanaris | |
| 7,244,205 | B2 | 7/2007 | Kanaris | |
| 7,510,073 | B2 | 3/2009 | Kanaris | |
| 7,753,193 | B2 * | 7/2010 | Kanaris | B65G 23/06 198/832 |
| 7,806,252 | B2 | 10/2010 | Kanaris | |
| 7,870,949 | B2 | 1/2011 | Kanaris | |
| 8,196,738 | B1 * | 6/2012 | Wolf | B65G 39/07 198/835 |
| 8,292,064 | B2 | 10/2012 | Kanaris | |
| 8,579,774 | B2 * | 11/2013 | Derscheid | A01F 15/18 198/835 |
| RE44,907 | E | 5/2014 | Kanaris | |
| RE44,919 | E | 6/2014 | Kanaris | |
| 9,284,131 | B2 | 3/2016 | Kanaris | |
| 2010/0051423 | A1 * | 3/2010 | Kim | G03G 15/0435 198/846 |

* cited by examiner

CONVEYOR ROLLER SURFACE ARRANGEMENT

FIELD OF THE INVENTION

The present invention relates to the field of conveyor rollers of the type used in conveyor systems driving a conveyor medium. More particularly, the present invention relates to surface arrangements for conveyor rollers, including conveyor drive rollers and conveyor idler rollers.

BACKGROUND OF THE INVENTION

A variety of conveyor systems have been designed and utilized to move materials from one location to another. By way of example, conveyor systems are used to move sand, gravel, crushed ore or rock, coal, and other materials, depending upon the particular industry involved. A large variety of known conveyor systems comprise a continuous belt or conveyor medium which travels over a series of conveyor rollers.

Typically, such conveyor systems utilized at least one conveyor drive roller which has a roller surface that is caused to rotate by an electric, hydraulic, or pneumatic motor positioned inside or outside of the conveyor drive roller. The conveyor drive roller translates the rotational movement of the roller surface to linear movement of the conveyor medium. In addition to one or more conveyor drive rollers, the conveyor system may include one or more conveyor idler rollers, which are not driven, and merely serve to support the conveyor medium as it moves thereover driven by the one or more conveyor drive rollers in the conveyor system.

By way of example, other prior art conveyor drive rollers are disclosed in U.S. Pat. Nos. RE44,919, RE44,907, 5,934,447, 6,766,900, 6,837,364, 6,938,754, 7,204,359, 7,228,952, 7,244,205, 7,510,073, 7,753,193, 7,806,252, 7,870,949, 8,292,064, and 9,284,131.

Conveyor driver rollers typically have a rotatable supporting surface, which is often covered by some form of surface arrangement to increase the co-efficient of friction between the conveyor drive roller and the conveyor medium, reduce the wear on the conveyor drive roller and the conveyor medium, and in some cases effect a self-cleaning action as particularized in U.S. Pat. No. 5,213,202. A typical surface arrangement is in the form of a continuous layer of rubber, or rubber-like material attached or bonded to the circumference of the rotatable supporting surface. Such a covering is sometimes referred to as lagging. The covering can include a multitude of materials that are attached by various methods. The most commonly used lagging is made of elastomeric components, which are bonded and cured by vulcanization to the conveyor drive roller and extend around the circumference of the rotatable supporting surface of the conveyor drive roller. Other common methods of attaching the lagging materials to the conveyor drive roller include bolting, painting, cementing, or spraying.

Similarly, conveyor idler rollers may also have a rotatable supporting surface, which is covered by some form of surface arrangement to reduce the wear on the conveyor idler roller and the conveyor medium, and in some cases effect a self-cleaning action.

In use, large forces are exerted on the lagging of conveyor rollers, including conveyor drive rollers and conveyor idler rollers, and mixed with the harsh environments in which conveyor rollers operate, over time, the lagging becomes worn or damaged. When that happens, the conveyor system must be stopped so that the conveyor roller may be removed from the system, inspected, and replaced or repaired. A worn lagging may signal a gentle failure requiring a planned shut down of the conveyor system, to permit repair or replacement at a time that is convenient for the operator. However, a damaged lagging may signal a critical failure requiring an unplanned shut down to avoid further damage to the conveyor roller itself, or damage to the other components in the conveyor system, such as for example, the conveyor medium and downstream components.

Conventionally, conveyor rollers have lagging arranged on their rotatable surface as a continuous sleeve of material which is friction fit or bonded to the rotatable supporting surface. However, over time, such a surface arrangement is prone to critical failure, requiring an unplanned emergency shut down, mentioned above. This is because a failure of the bond (i.e. delamination) in one portion along the circumference of the rotatable supporting surface quickly spreads to the remaining portions, resulting in damage to, and/or shedding of the entire lagging. Often this form of failure results in a critical condition in the operation of the conveyor system, which signals an operator to effect an unplanned emergency shut down of the conveyor system. When this happens, the conveyor system remains out of commission until the damaged conveyor roller can be replaced or repaired.

U.S. Pat. No. 3,354,735 (Holz), U.S. Pat. No. 3,789,682 (Holz), U.S. Pat. No. 4,4824,409 (Van Teslaar), U.S. Pat. No. 4,718,544 (Herren), and U.S. Pat. No. 4,832,669 (Holz), disclose attempts at overcoming some of the problems associated with replacing worn or damaged lagging on conveyor rollers. For example, U.S. Pat. No. 3,354,735 (Holz), U.S. Pat. No. 3,789,682 (Holz), U.S. Pat. No. 4,4824,409 (Van Teslaar), U.S. Pat. No. 4,718,544 (Herren), and U.S. Pat. No. 4,832,669 (Holz), each disclose a conveyor surface arrangement comprising a plurality of separate sections attached to the surface of the conveyor roller, wherein each section comprises a rubber material bonded to a metal backing plate. The sections are attached to the conveyor roller surface by their metal backing plates. U.S. Pat. No. 4,284,409 discloses securing the backing plates to the surface of the conveyor roller using fasteners. U.S. Pat. Nos. 4,718,544 and 4,832,669 disclose welding the backing plates to the surface of the conveyor roller. U.S. Pat. Nos. 3,354,735 and 3,789,682 disclose providing strips or tabs on the surface of the conveyor roller to serve as guides or retaining members configured to slidingly receive the metal backing plates, and then securing the metal backing plates to the surface of the conveyor roller with fasteners or by welding.

However, problems exist with the conveyor roller surface arrangements disclosed in the above noted patents. The foremost is the increased cost associated with manufacturing the metal backed lagging sections for attachment to the surface of the conveyor roller. In particular, necessitating the metal backing plate for attachment to the surface of a conveyor roller requires additional materials and labour costs to make the conveyor roller, as compared to a conveyor roller in which lagging is attached directly to the surface of the conveyor roller without using a metal backing plate. The metal plate backed lagging sections also require specialized equipment for their manufacture, which adds further to the cost of their manufacture.

Additionally, the metal plate backed lagging sections impose a further storage related cost. One will appreciate that since the metal plate backed lagging sections are manufactured with specialized equipment to conform to predetermined shapes and sizes, an operator of a conveyor system incorporating conveyor rollers with the pre-made metal plate backed lagging sections, or a conveyor system repair facility will need to stock metal plate backed lagging sections of different dimensions specific to each of the different conveyor rollers. Such a requirement imposes an associated storage costs.

Furthermore, necessitating securing the metal plate backed lagging sections to conveyor rollers by using fasteners or welding, as taught in the above noted patents, increases labour costs associated with replacing worn or damaged sections, since additional labour is required to remove the fasteners and/or the welds used to secure the metal plate backed sections.

Other prior art patents of general interest in the field of conveyor roller surface arrangements include U.S. Pat. No. 6,89,521 (Titus), U.S. Pat. No. 3,789,682 (Holz), U.S. Pat. No. 6,168,544 (Barnes), and U.S. Pat. No. 6,692,392 (Finnegan), and U.S. Pat. No. 4,821,871 (Herren).

Therefore there is a continuing need for improvement in the design of conveyor roller surface arrangements.

SUMMARY OF THE INVENTION

What is desired are improved surface arrangements for conveyor rollers, and conveyor rollers incorporating same, which may provide reduced manufacturing, maintenance, and/or repair costs. Methods of making improved surface arrangements and for repairing same are also desired.

According to a preferred embodiments of the present invention, there are disclosed surface arrangements for conveyor rollers, including conveyor drive rollers and conveyor idler rollers. The preferred conveyor roller surface arrangement has a rotatable supporting surface, a plurality of shear stop members extending therefrom in spaced apart relation relative to each other around the circumference of the rotatable supporting surface, and a plurality of lagging members positioned on the rotatable supporting surface between the spaced apart shear stop members. Preferably, the lagging members are bonded to the rotatable supporting surface such that at least portions of their ends abut at least portions of the shear stop members. Most preferably, the lagging members may be snugly fit between the spaced apart shear stop members, such that each lagging member may be positioned between two shear stop members with at least portions of both ends of the lagging member abutting at least portions of lagging member abutting surfaces of the two shear stop members positioned on either side thereof.

Without being bound by any particular theory, it has been discovered that bonding the lagging members to the rotatable supporting surface with their ends abutting shear stop members adapted to resist movement of the lagging members in one direction along the circumference of the rotatable supporting surface, reduces shear forces exerted on the bonds holding the lagging members to the rotatable supporting surface, in that same direction, when the conveyor roller is in use. By reducing the shear force exerted on the bonds with the disclosed conveyor roller surface arrangement, the bonds may be less prone to failure. Additionally, by reducing the shear force exerted on the bonds with the disclosed conveyor roller surface arrangement, the bonds may be provided with a weaker bond strength than otherwise possible. Providing bonds having a weaker bond strength may be desirable to facilitate removal of a worn or damaged lagging member when the conveyor roller surface arrangement requires maintenance or repair.

Furthermore, the conveyor roller surface arrangement of the present invention may provide a more gentle failure, in which only one of the plurality of lagging members becomes worn, damaged, or separated. The conveyor roller surface arrangement of the present invention may permit a failure in which failure of the bond associated with one of the plurality of lagging members results in the shedding of only the one lagging member associated with the failed bond, without spreading to the other of the plurality of lagging members. By comparison, in a conventional conveyor roller having a continuous lagging provided around the circumference of the roller surface, a failure of the bond in one section will quickly spread to the remaining sections, resulting in damage to, and/or shedding of the entire lagging.

Accordingly, a failure of the bond associated with only one of the plurality of lagging members, according to the present invention, may permit continued operation of the conveyor roller until a planned shut down of the conveyor system and repair of the conveyor roller surface arrangement may be scheduled, rather than a critical failure requiring an unplanned emergency shut down of the conveyor system, as would be the likely outcome of a bond failure in a section of continuous lagging in the conventional conveyor roller. As will be appreciated, a planned shut down for maintenance or repair has fewer adverse consequences associated with it than an unplanned emergency shut down.

Additionally, embodiments of the present invention may provide a method of replacing a worn or damaged lagging member bonded to the conveyor roller surface arrangement of a conveyor roller, that overcomes at least some of the problems associated with prior art conveyor rollers.

Therefore, in accordance with one aspect of the present invention, there is provided a surface arrangement for a conveyor roller adapted for use in a conveyor system configured to support and move a conveyor medium, said surface arrangement comprising:

a rotatable supporting surface having a cylindrical shape, said rotatable supporting surface defining an axis of rotation;

at least one shear stop member extending outwardly from said rotatable supporting surface;

at least one lagging member positioned on said rotatable supporting surface, with at least a portion of one end of said at least one lagging member abutting at least a portion of said at least one shear stop member; and a bond between said at least one lagging member and said rotatable supporting surface;

wherein said at least one shear stop member is adapted to resist movement of said at least one abutting lagging member in at least one direction along the circumference of said rotatable supporting surface to reduce a shear force exerted on said bond when said conveyor roller is in use.

In accordance with another aspect of the present invention, there is provided a method of making a surface arrangement for a conveyor roller for use in a conveyor system configured to support and move a conveyor medium, said method comprising the steps of:

forming a rotatable supporting surface having a cylindrical shape, said rotatable supporting surface defining an axis of rotation;

providing at least one shear stop member on said rotatable supporting surface, said at least one shear stop member extending outwardly from said rotatable supporting surface;

providing at least one lagging member on said rotatable supporting surface, with at least a portion of one end thereof abutting at least a portion of said at least one shear stop member; and bonding said at least one lagging member to said rotatable supporting surface;

wherein said at least one shear stop member resists movement of said at least one abutting lagging member in at least one direction along the circumference of said rotatable supporting surface to reduce a shear force exerted on said bond when said conveyor roller is in use.

In accordance with another aspect of the present invention, there is provided a method of replacing a worn or damaged lagging member bonded to the surface arrangement mentioned above or the surface arrangement made according to the method mentioned above, said method of replacing said worn or damaged lagging member comprising the steps of:

removing from said rotatable supporting surface said worn or damaged lagging member abutting said at least one shear stop member;

providing a replacement lagging member;

positioning said replacement lagging member on said rotatable supporting surface, with at least a portion of one end of said replacement lagging member abutting at least a portion of said at least one shear stop member;

bonding said replacement lagging member to said rotatable supporting surface;

wherein said at least one shear stop member resists movement of said at least one abutting replacement lagging member in at least one direction along the circumference of said rotatable supporting surface to reduce a shear force exerted on said bond when said conveyor roller is in use.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention.

Figure 1:
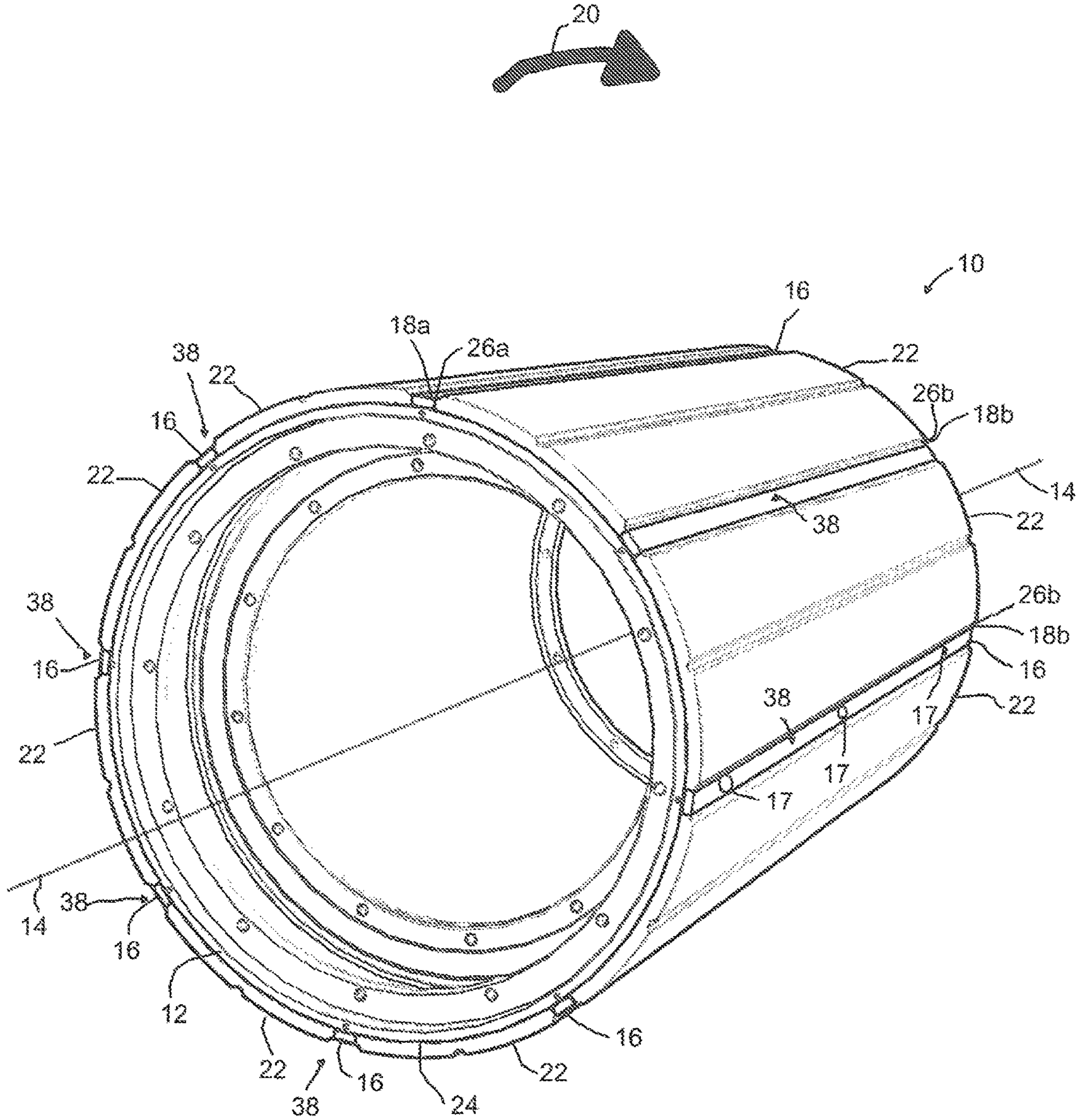
FIG. 1 is a perspective view of a conveyor roller surface arrangement according to an embodiment of the present invention, showing a rotatable supporting surface, a plurality of shear stop members, and a plurality of lagging members.

A surface arrangement 10 for a conveyor roller or pulley, according to an embodiment of the present invention is shown in FIG. 1. As shown, the conveyor roller surface arrangement 10 has a rotatable supporting surface 12 having a cylindrical shape. As best seen in FIG. 1, the rotatable supporting surface 12 defines an axis of rotation 14. Preferably, a plurality of shear stop members 16 extend outwardly from the rotatable supporting surface 12, uniformly spaced apart from each other around a circumference of the rotatable supporting surface 12. In this example, there are eight shear stop members 16 extending from the rotatable supporting surface 12, each oriented substantially parallel to the axis of rotation 14. Preferably, each shear stop member 16 is a unitary member, as shown. Fewer or more shear stop members 16 may be used in conveyor roller surface arrangements 10 of other embodiments of the present invention.

However, it is contemplated that at least one shear stop member 16 may be used in a conveyor roller surface arrangement 10.

According to other embodiments of the present invention, the shear stop members 16 may be non-uniformly spaced apart from each other around a circumference of the rotatable supporting surface 12, or that they may be oriented at an angle relative to the axis of rotation 14. As well, the shear stop members 16 may be non-unitary, being formed from two or more separate members. Furthermore, the two or more separate members may be arranged on the rotatable supporting surface 12 to form a continuous, or a discontinuous non-unitary member. All such embodiments are comprehended by the present invention.

Preferably, the one or more shear stop members 16 may be made of metal, however it is contemplated that other materials that can be affixed to the rotatable supporting surface 12, may be used according to other embodiments of the present invention. Preferably, the material used for the shear stop members 16 will be sufficiently rigid to resist movement of an abutting lagging member 22, when the conveyor roller is in use, as discussed in more detail below. In this regard, good results have been obtained by fixing the one or more metal shear stop members 16 to the rotatable supporting surface 12 by welding. The one or more shear stop members 16 may also be fixed to the rotatable supporting surface using one or more fasteners 17, or by forming the one or more shear stop members 16 unitarily with the rotatable supporting surface 12. Other methods for fixing the shear stop members 16 to the rotatable supporting surface 12 will be apparent to persons skilled in the art, all of which are comprehended by the present invention.

The embodiment of the invention illustrated by FIG. 1, will be described next in the context of a conveyor roller surface arrangement 10 for a conveyor drive roller. As will be appreciated, a conveyor drive roller applies a driving force to the conveyor web, at the points of contact between the conveyor roller surface arrangement 10 and the conveyor medium, in the direction of rotation 20 of the rotatable supporting surface 12, to move the conveyor medium. As such, the conveyor medium applies a force on the conveyor roller surface arrangement 10, at the points of contact between the conveyor roller surface arrangement 10 and the conveyor medium, in the opposite direction.

Figure 3:
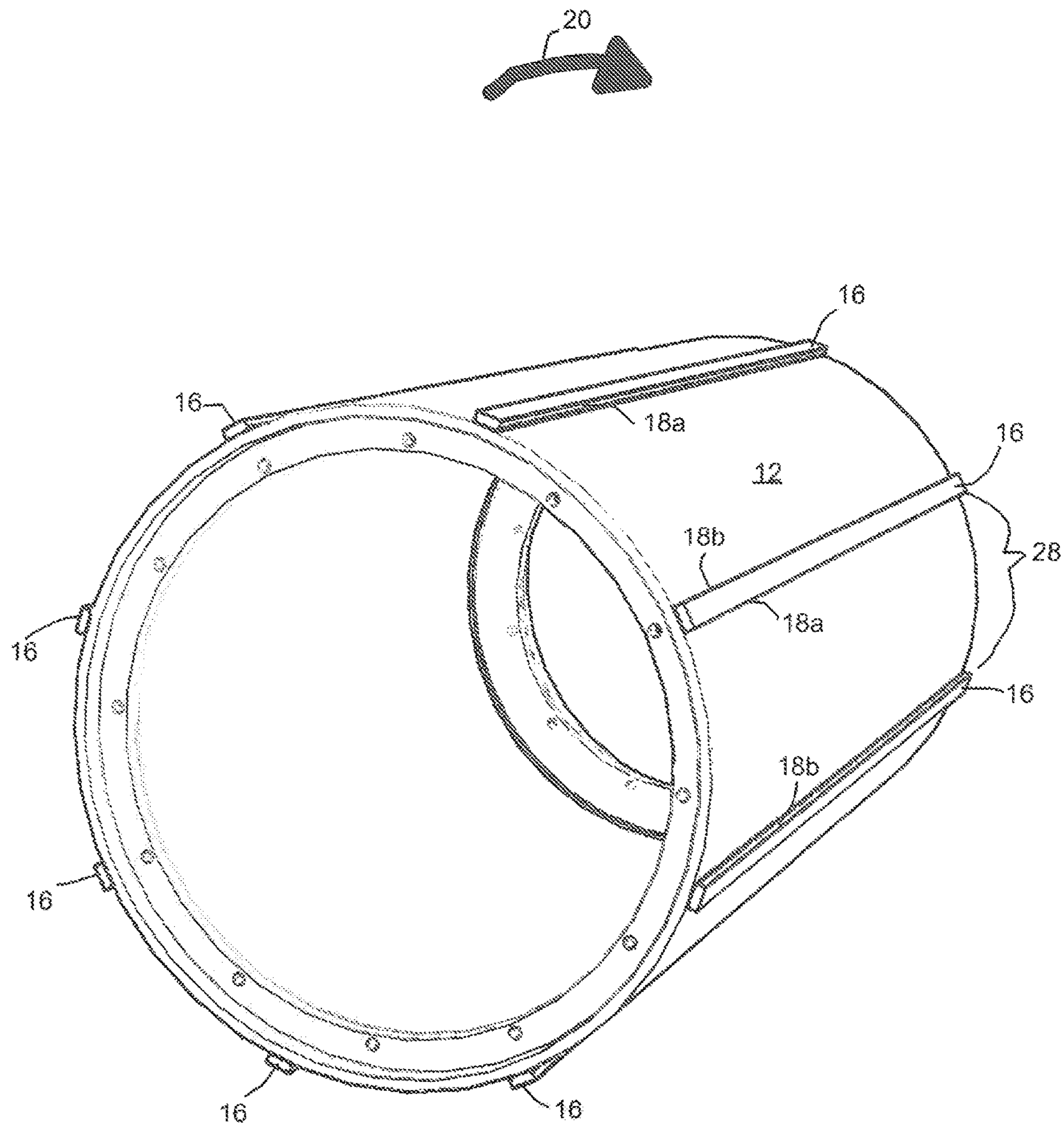
FIG. 3 is a perspective view of the conveyor roller surface arrangement of FIG. 1 without the lagging members bonded to the rotatable supporting surface to more clearly illustrate the plurality of shear stop members.
Figure 4:
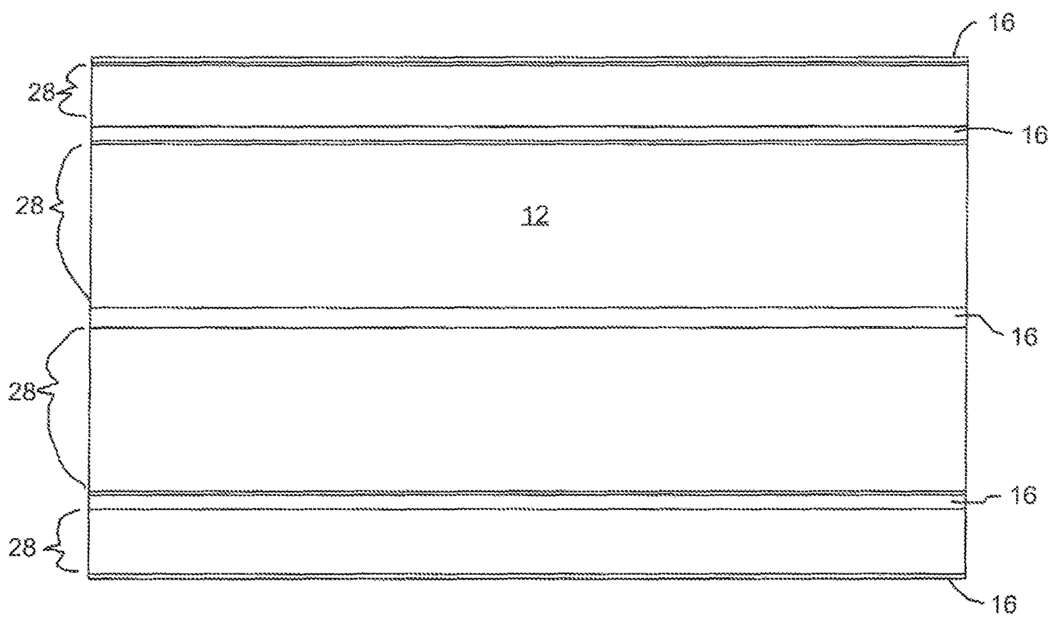
FIG. 4 is a front view of the conveyor roller surface arrangement of FIG. 3.
Figure 5:
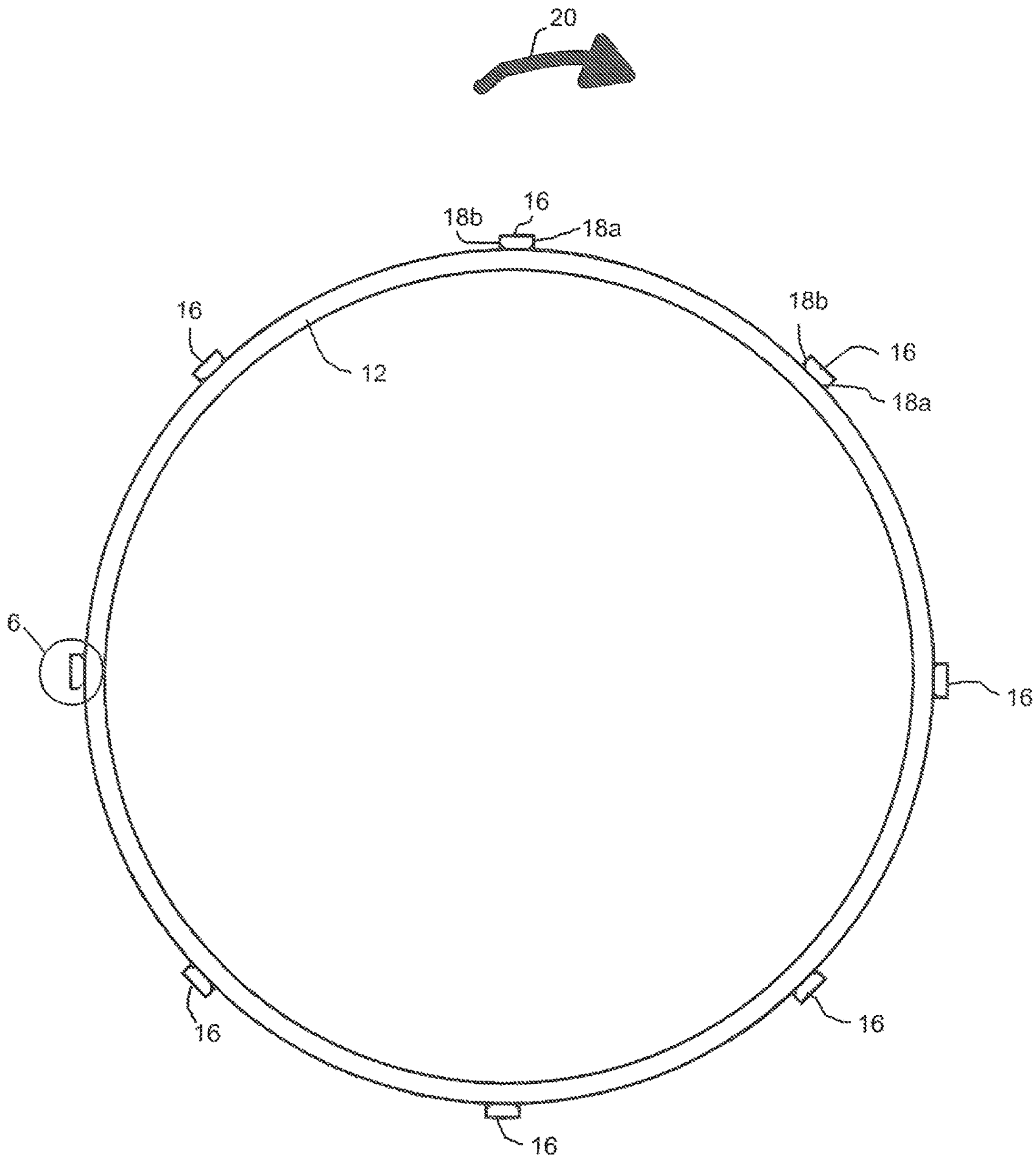
FIG. 5 is a side view of the conveyor roller surface arrangement of FIG. 3.

According to this example each one of the shear stop members 16 defines a lagging member abutting surface **18*a* (best seen in FIGS. 3, 5, and 6) facing the direction of rotation of the rotatable supporting surface 12, to resist movement of an abutting lagging member 22 in a direction opposite the direction of rotation of the rotatable supporting surface 12, as discussed in more detail below. In this example the direction of rotation of the rotatable supporting surface 12 is clockwise about the axis of rotation 14, as indicated by arrow 20. However, the direction of rotation 20 may be counter-clockwise about the axis of rotation 14 in other embodiments of the present invention. In still further embodiments of the present invention, the direction of rotation 20 of the rotatable supporting surface 12** may alternate between clockwise and counter-clockwise directions, for example in situations where it may be desirable for the conveyor drive roller to be operated in both directions at different times.

With continuing reference to FIG. 1, a plurality of lagging members 22 are shown positioned on the rotatable supporting surface 12. In this example, there are eight lagging members 22 positioned on the rotatable supporting surface 12. Each of the lagging members 22 is attached to the rotatable supporting surface 12 by a bond between the lagging member 22 and the rotatable supporting surface 12. Fewer or more lagging members 22 may be used in conveyor roller surface arrangements 10 of other embodiments of the present invention. However, it is contemplated that at least one lagging member 22 may be used in a conveyor roller surface arrangement 10, together with the at least one shear stop member 16, mentioned above.

Good results have been obtained with lagging members 22 made from rubber (whether natural, synthetic, or blended), rubber-like material, urethane, silicone, or the like. The conveyor medium engaging surfaces of the lagging members 22 may be provided with a pattern or embedded with ceramic, to impart desirable operating qualities, such as for example, reducing slip between the conveyor roller and the conveyor medium, reducing abrasion of the conveyor medium, increasing durability of the lagging members 22, increasing clearing of debris between the conveyor roller and the conveyor medium, etc., as is known in the art. The choice of material for making the lagging members 22 may therefore depend on several factors, including the desire to reduce slip (i.e. the relative motion between the conveyor medium and the conveyor roller), which may be caused by a change in load, a change in temperature, a change in stretch of the conveyor medium, a change in coefficient of friction between the conveyor medium and the conveyor roller due to infiltration of foreign substances, etc.

Preferably the lagging members 22 may have a hardness from 45 shore to 65 shore. According to preferred embodiments of the conveyor roller surface arrangement 10, the lagging members 22 may also be provided with a thickness which is greater than a thickness of the shear stop members 16. In this way, the conveyor roller surface arrangement 10 will preferably have channels 38 between the lagging members 22, formed by the difference in thickness of the lagging members 22 relative to the thickness of the shear stop members 16. In other words, the conveyor medium engaging surface of the lagging members 22 will be elevated relative to the tops of the shear stop members 16 resulting in channels 38 formed in the conveyor roller surface arrangement 10 having a width and shape defined by the width and shape of the shear stop members 16 themselves. Preferably, the difference will result in the tops of the shear stop members 16 to be from 1/16 inch to 3/16 inch below the conveyor medium engaging surfaces of the lagging members 22. However, it is contemplated that it may be desirable to have the difference between the heights range from 0 inch (i.e. height of shear stop member is equal to height of conveyor medium engaging surface of the lagging member 22) to 1/4 inch in other embodiments of the present invention. It has been found that providing channels 38 in the conveyor roller surface arrangement 10 may help the conveyor roller to self-clear debris, for example debris from conveyed material, abraded lagging material or conveyor medium, other material in the environment (i.e. water, snow, dust, sand, dirt, oil, etc.) that may otherwise remain trapped between the conveyor roller and the conveyor medium. Providing self-clearing of debris in this manner may be helpful for extending the service life of the conveyor medium and the conveyor roller surface arrangement 10, as well as for reducing slip between the conveyor roller and the conveyor medium. Additionally, it has been found that spacing the tops of the shear stop members 16 from the conveyor medium engaging surface of the conveyor roller surface arrangement 10 prevents the shear stop members 16 from contacting the conveyor medium, resulting in reduced wear on the conveyor medium. It has also been found that providing the channels 38 improve heat transfer from the interior of the conveyor roller to the surface via the metal shear stop members 16, which is particularly helpful for removing heat buildup inside of a conveyor drive roller, and to cool the conveyor drive roller.

The lagging members 22 may be pre-made to conform to specific sizes, thicknesses, and shapes suitable for use with specific conveyor roller surface arrangements 10. However, the lagging members 22 may also be provided in the form of larger stock sections, rolls, or the like, to be cut down to desired sizes and shapes. Providing the lagging members 22 in such larger stock sections or rolls may reduce storage costs for operators or repair facilities, as it will avoid the need to stock lagging members 22 of different dimensions specific to each of the different conveyor rollers they operate or service. Such pre-made, pre-sized or cut-to-size lagging members 22 may be bonded to the rotatable supporting surface 12 with an adhesive. Preferably, the lagging members 26 may also be formed on the rotatable supporting surface by vulcanizing sheets of uncured calendared rubber as discussed in more detail below.

Preferably, the bond 24 between lagging members 22 and the rotatable supporting surface may be a hot bond, such as for example a vulcanized bond, or a cold bond, such as for example an adhesive. Preferably, the bond 24 may have a strength sufficient to overcome centrifugal force acting on the lagging members 22 resulting from the rotation of the conveyor roller, when the conveyor roller is in use. By way of example, good results have been obtained with bond strengths ranging from 400 to 600 pounds/inch$^2$ at 68° F., and from 270 to 365 pounds/inch$^2$ at 212° F.

As shown in FIG. 1, each of the lagging members 22 is positioned on the rotatable supporting surface 12 with end 26*a* (i.e. the end facing opposite the direction of rotation 20 of the rotatable supporting surface 12), abutting the lagging member abutting surface 18*a* of one of the shear stop members 16 (i.e. the lagging member abutting surface facing the direction of rotation 20).

As noted above, the direction of rotation 20 of the rotatable supporting surface 12 is shown to be clockwise about the axis of rotation 14 in FIG. 1. However, the direction of rotation 20 may be reversed (i.e. counter-clockwise about the axis of rotation 14) in other embodiments of conveyor surface arrangements 10 for conveyor drive rollers according to the present invention. According to such other embodiments, each of the lagging members 22 may be positioned on the rotatable supporting surface 12 with end 26*b* (i.e. the end facing opposite the direction of rotation 20 of the rotatable supporting surface 12), abutting the lagging member abutting surface 18*b* of one of the shear stop members 16 (i.e. the lagging member abutting surface facing the direction of rotation 20).

As also noted above, in conveyor roller surface arrangements 10 for conveyor drive rollers which are intended to rotate in either direction about the axis of rotation 14 (i.e. clockwise and counter-clockwise), or to alternate between rotating in one direction and the reverse direction, each shear stop member 16 may be provided with two lagging member abutting surfaces 18*a* and 18*b*, such that each lagging member abutting surface 18*a*, 18*b* faces one of the two possible directions of rotation 20 of the conveyor drive roller.

What is important is that the one or more shear stop members 16 have a lagging member abutting surface 18*a* or 18*b* that faces the intended direction of rotation 20 of the rotatable supporting surface 12, and as discussed in more detail below, that may necessitate providing each of the shear stop members 16 with two lagging member abutting surfaces 18*a*, 18*b*, such that each of the two lagging member abutting surfaces 18*a*, 18*b* faces one of the two possible directions of rotation 20 of the rotatable supporting surface 12 about the axis of rotation 14. Preferably, the lagging member abutting surfaces 18*a*, 18*b* may be oriented substantially parallel to the axis of rotation 14 of the rotatable supporting surface 12, or at an angle 34 relative to the axis of rotation 14 of the rotatable supporting surface 12. Preferably, the angle 34 may range from 0 degrees to 45 degrees relative to the axis of rotation 14.

It should be noted that FIG. 1 shows, by way of example, an embodiment of the invention in which the conveyor roller surface arrangement 10 has a plurality of lagging members 22 sized and shaped so that ends 26*a*, 26*b* of each lagging member abuts lagging member abutting surfaces 18*a*, 18*b*, of the two shear stop members 16 on either side of it. In other words, each of the lagging members 22 is sized and shaped to fill the space between one shear stop member 16 and the next shear stop member 16 around the circumference of the rotatable supporting surface 12. Since both of ends 26*a* and 26*b* of each lagging member 22 abut respective lagging member abutting surfaces 18*a* and 18*b* of adjacent shear stop members 16, this embodiment is an example which may be useful irrespective of whether the direction of rotation 20 of the rotatable supporting surface is clockwise or counter-clockwise. Such an embodiment may also be useful in applications requiring the conveyor drive roller to alternate between rotating in one direction and the reverse direction.

Figure 2:
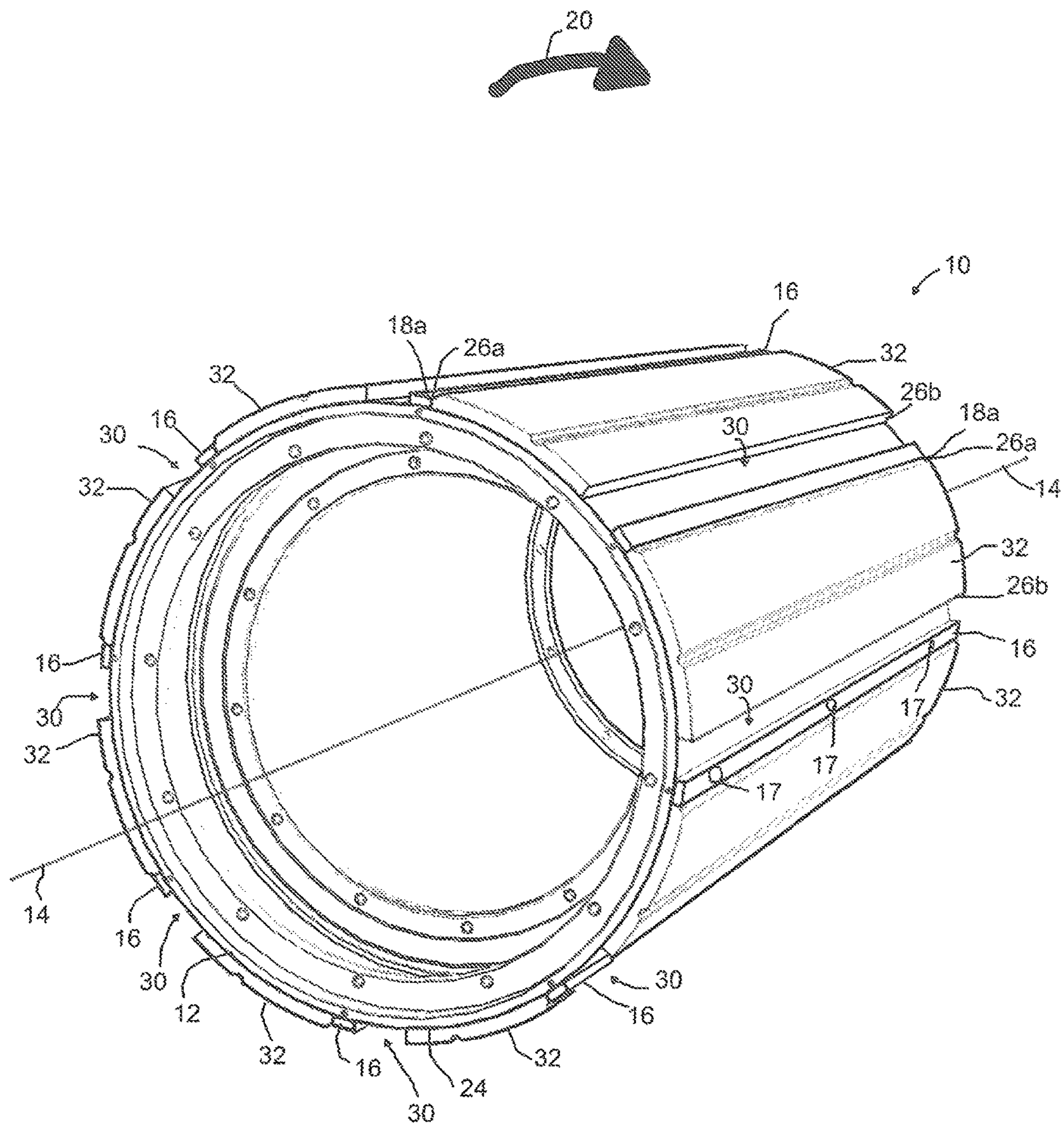
FIG. 2 is a perspective view of a conveyor roller surface arrangement according to another embodiment of the present invention, showing a rotatable supporting surface, a plurality of shear stop members, and a plurality of short lagging members.

According to other embodiments of the present invention, some or all of the lagging members 22 may be sized and shaped so as not fill the space 28 between one of the shear stop members 16 and the next one of the shear stop members 16 around the circumference of the rotatable supporting surface 12. As shown in FIG. 2, a gap 30 may be formed between a short lagging member 32 and the next shear stop member 16, in the direction of rotation 20 of the rotatable supporting surface 12. According to this embodiment, it is preferable that each of the short lagging members 32 is positioned on the rotatable supporting surface 12 with end 26*a* (i.e. the end facing opposite the direction of rotation 20 of the rotatable supporting surface 12), abutting the lagging member abutting surface 18*a* of one of the shear stop members 16 (i.e. the side surface facing the direction of rotation 20). As noted above, in this example, the direction of rotation 20 of the rotatable supporting surface 12 is clockwise about the axis of rotation 14. If the direction of rotation 20 was reversed (i.e. counter-clockwise), then end 26*b* (i.e. the other end of the short lagging member 32, which is opposite to end 26*a*), of each of the short lagging members 32 would be facing the direction of rotation 20, and it would be these other ends 26*b* that would preferably be positioned to abut lagging member abutting surfaces 18*b* of the shear stop members 16 next to them.

Additionally, although the embodiment of the invention illustrated in FIG. 1 shows the entire ends 26*a*, 26*b* of lagging members 22 abutting the entire lagging member abutting surfaces 18*a*, 18*b*, it is contemplated that in other embodiments of the invention only portions, whether continuous or discontinuous, of the ends 26*a*, 26*b* of lagging members 22 abut only portions, whether continuous or discontinuous, of the lagging member abutting surfaces 18*a*, 18*b* of shear stop members 16. All such embodiments are comprehended by the present invention.

The above describes embodiments of the conveyor roller surface arrangement 10 for a conveyor drive roller. However, the same principles apply to embodiments of the conveyor roller surface arrangement 10 for a conveyor idler roller. As will be appreciated, a conveyor idler roller receives a driving force from the conveyor web, at the points of contact between the conveyor roller surface arrangement 10 and the conveyor medium, in the direction opposite the rotation 20 of the rotatable supporting surface 12, as the conveyor medium moves thereover. As such, the conveyor medium applies a force on the conveyor roller surface arrangement 10, at the points of contact between the conveyor roller surface arrangement 10 and the conveyor medium, in the same direction as the direction of rotation 20 of the rotatable supporting surface 12.

According to this example, with reference to FIG. 1, each one of the shear stop members 16 defines a lagging member abutting surface 18*b* (best seen in FIGS. 3, 5, and 6) facing opposite the direction of rotation of the rotatable supporting surface 12, to resist movement of an abutting lagging member 22 in the same direction as the direction of rotation of the rotatable supporting surface 12. In this example the direction of rotation of the rotatable supporting surface 12 is clockwise about the axis of rotation 14, as indicated by arrow 20. However, the direction of rotation 20 may be counter-clockwise about the axis of rotation 14 in other embodiments of the present invention. In still further embodiments of the present invention, the direction of rotation 20 of the rotatable supporting surface 12 may alternate between clockwise and counter-clockwise directions, for example in situations where it may be desirable for the conveyor idler roller to be operated in both directions at different times.

With continued reference to FIG. 1, each of the lagging members 22 is positioned on the rotatable supporting surface 12 with end 26*b* (i.e. the end facing the direction of rotation 20 of the rotatable supporting surface 12), abutting the lagging member abutting surface 18*b* of one of the shear stop members 16 (i.e. the lagging member abutting surface facing opposite the direction of rotation 20).

As noted above, the direction of rotation 20 of the rotatable supporting surface 12 is shown to be clockwise about the axis of rotation 14 in FIG. 1. However, the direction of rotation 20 may be reversed (i.e. counter-clockwise about the axis of rotation 14) in other embodiments of conveyor roller surface arrangements for conveyor idler rollers according to the present invention. According to such other embodiments, each of the lagging members 22 may be positioned on the rotatable supporting surface 12 with end 26*a* (i.e. the end facing the direction of rotation 20 of the rotatable supporting surface 12), abutting the lagging member abutting surface 18*a* of one of the shear stop members 16 (i.e. the lagging member abutting surface facing the direction of rotation 20).

In conveyor roller surface arrangements 10 for conveyor idler rollers which are intended to rotate in either direction about the axis of rotation 14 (i.e. clockwise and counter-clockwise), or to alternate between rotating in one direction and the reverse direction, each shear stop member 16 may be provided with two lagging member abutting surfaces 18*a* and 18*b*, such that each lagging member abutting surface 18*a*, 18*b* faces one of the two possible directions of rotation 20 of the conveyor idler roller.

What is important is that the one or more shear stop members 16 have a lagging member abutting surface 18*a* or 18*b* that faces the intended direction of rotation 20 of the rotatable supporting surface 12, and as mentioned above, that may necessitate providing each of the shear stop members 16 with two lagging member abutting surfaces 18*a*, 18*b*, such that each of the two lagging member abutting surfaces 18*a*. 18*b* faces one of the two possible directions of rotation 20 of the rotatable supporting surface 12 about the axis of rotation 14. Preferably, the lagging member abutting surfaces 18*a*, 18*b* may be oriented substantially parallel to the axis of rotation 14 of the rotatable supporting surface 12, or at an angle 34 relative to the axis of rotation 14 of the rotatable supporting surface 12. Preferably, the angle 34 may range from 0 degrees to 45 degrees relative to the axis of rotation 14.

As noted above, FIG. 1 shows, by way of example, an embodiment of the invention in which the conveyor roller surface arrangement 10 has a plurality of lagging members 22 sized and shaped so that ends 26*a*, 26*b* of each lagging member abuts lagging member abutting surfaces 18*a*, 18*b*, of the two shear stop members 16 on either side of it. In other words, each of the lagging members 22 is sized and shaped to fill the space between one shear stop member 16 and the next shear stop member 16 around the circumference of the rotatable supporting surface 12. Since both of ends 26*a* and 26*b* of each lagging member 22 abut respective lagging member abutting surfaces 18*a* and 18*b* of adjacent shear stop members 16, this embodiment is an example which may be useful irrespective of whether the direction of rotation 20 of the rotatable supporting surface is clockwise or counter-clockwise. Such an embodiment may also be useful in applications requiring the conveyor idler roller to alternate between rotating in one direction and the reverse direction.

Without being bound by any particular theory, the one or more shear stop members 16 resist movement of the one or more abutting lagging members 22 in at least one direction along the circumference of the rotatable supporting surface 10 to reduce a shear force exerted on the bond 24 in the at least one direction when the conveyor roller is in use. Preferably, in the case of a conveyor drive roller, one or more shear stop members 16 resist movement of one or more lagging members 22 in a direction opposite the direction of rotation 20 of the rotatable supporting surface 12. Based on the same principle, in the case of a conveyor idler roller, it is preferred that one or more shear stop members 16 resist movement of one or more lagging members 22 in the same direction as the direction of rotation 20 of the rotatable supporting surface 12.

As will now be appreciated, the shear stop members 16 will preferably oppose some of the forces applied to the lagging members 22 from their interaction with the conveyor medium during operation of the conveyor roller in the conveyor system. Preferably the shear stop members 16 will reduce the shear force exerted on the bond 24 between the lagging members 22 and the rotatable supporting surface 12. The reduction in the shear force exerted on the bond 24 may increase the fatigue life of the bond 24, and reduce the likelihood of the lagging members 22 shedding or delaminating from the rotatable supporting surface 12. The stress that the sheer stop members 22 are expected to carry may be equal to the belt pull force of, for example, a conveyor drive roller, divided by the surface area of the lagging member abutting surface 18*a* or 18*b*, as the case may be, of the shear stop members 16 abutting the ends 26*a* or 26*b*, as the case may be, of the lagging members 22.

For example, in a conveyor drive roller operating at a power of 180 horsepower, a conveyor medium (i.e. conveyor belt) speed of 800 feet/minute, and a width of 67 inches, the anticipated belt pull force will be about 7,425 lbf, calculated as follows: (33,000×180 hp)+800 ft/min=7,425 lbf. The surface area of lagging member abutting surface 18*a*, for example, of shear stop member 16 that will be subjected to a portion of the belt pull force transmitted to it through the abutting lagging member 22 may be calculated as the Height of the shear stop member 16 multiplied by its Length. In this example, the surface area of the shear stop member 16 subjected to the stress of the belt pull force is ½ inch×67 inches, which equals 33.5 square inches. Thus the portion of the belt pull force exerted on the lagging member 22 that is resisted by the shear stop member 16, in this example, may be calculated as 7,425 lbf÷33.5 square inches, which equals about 221 pounds per square inch. This means that in this example, the shear stop member 16 reduces a shear force exerted on the bond 24, when the conveyor drive roller is in use, equal to about 221 pounds per square inch. Based on the above, the person skilled in the art will appreciate that the effect of the shear stop member 16 to reduce the shear force exerted on the bond 24 will vary depending on at least the thickness of the lagging member 22, the dimensions of the shear stop member 16, the angle 34 of the shear stop member 16, and the load.

As a consequence of the reduction in the shear force exerted on the bond 24, conveyor rollers, including conveyor drive rollers and conveyor idler rollers, incorporating a conveyor surface arrangement 10 according to the present invention may be less prone to a failure of the bond 24, in part or in whole, and the shedding of the lagging member 22 resulting from such a failure of the bond 24. Furthermore, the bond 24 may be provided with a bond strength that is less than the bond strength required to overcome the shear force in a conveyor roller surface arrangement in which a shear stop member 16 is not used to abut the lagging member 22. Providing a bond 24 with a weaker bond strength may be desirable to make it easier to remove and replace worn or damaged lagging members 36 from the rotatable supporting surface 12, as discussed in more detail below. For example, the bond 24 may be adapted to permit easy removal and replacement of the worn or damaged lagging member 36, yet still be sufficiently strong, due to the interaction of the lagging member 22 and the abutting shear stop member 16, to overcome the shear force exerted on the bond, when the conveyor roller is in use. In other words, a preferred embodiment of the present invention may provide for a conveyor roller surface arrangement 10 which facilitates removal and replacement of worn or damaged lagging members 36, due to a weaker bond 24, without compromising the durability, reliability or service life of the surface arrangement 10.

With reference to FIGS. 3 to 7, the following describes a method of making a surface arrangement 10 for a conveyor roller, including a conveyor drive roller and a conveyor idler roller, adapted for use in a conveyor system configured to support and move a conveyor medium. Starting with FIG. 3, a rotatable supporting surface 12 is formed. Preferably, the rotatable supporting surface 12 is formed from metal and has a cylindrical shape. As best seen in FIG. 1, the rotatable supporting surface 12 defines an axis of rotation 14. Preferably, a plurality of shear stop members 16 are provided on the rotatable supporting surface 12, uniformly spaced apart from each other around the circumference of the rotatable supporting surface 12. As shown, the shear stop members 16 extend outwardly from the rotatable supporting surface 12. In this example, there are eight shear stop members 16 extending from the rotatable supporting surface 12, each oriented substantially parallel to the axis of rotation 14. Preferably, each shear stop member 16 is a unitary member, as shown. Fewer or more shear stop members 16 may be used in conveyor roller surface arrangements 10 of other embodiments of the present invention. However, it is contemplated that at least one shear stop member 16 may be used in a conveyor roller surface arrangement 10.

Figure 6:
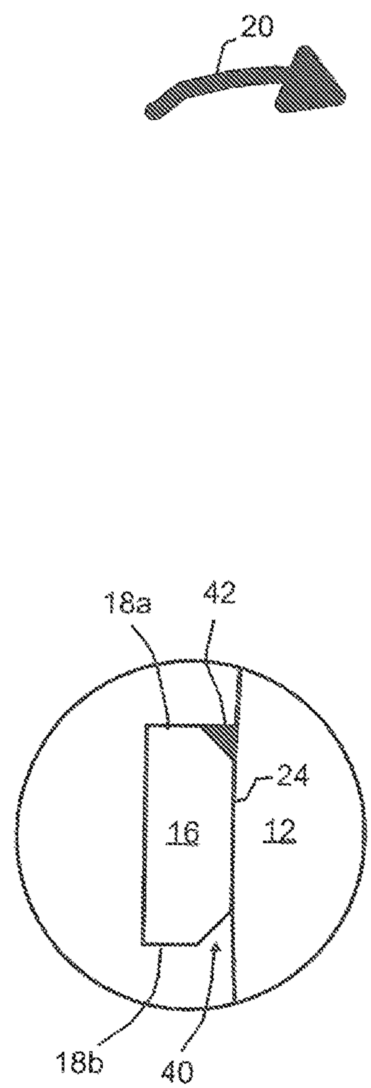
FIG. 6 is an enlarged side view of region 6 of FIG. 5, showing details of a shear stop member, including a cavity on one side of the shear stop member, and a bead of welding material filling the cavity on the other side.

Preferably, the one or more shear stop members 16 may be made of metal. In this regard, good results have been obtained by fixing the one or more metal shear stop members 16 to the rotatable supporting surface 12 by welding. As can be seen from FIGS. 4 to 6, the shear stop members 16 may be provided in the form of elongate rectangular metal bars. To facilitate the welding process, the bottom edges of the shear stop members 16 may preferably be omitted during forming, or removed by cutting, grinding, or the like, as best seen in FIG. 6. In this way, when the shear stop member 16 is positioned on the surface of the rotatable supporting surface 12, a cavity 40 will be formed along the length of the shear stop member 16, on both sides of the shear stop member 16. The shear stop member 16 can then be welded to the rotatable supporting surface 12 by filling the cavities 40 formed on both sides of the shear stop member 16 with a bead of welding material 42, to fix the shear stop member 16 to the rotatable supporting surface 12. Preferably, any excess welding material may then be removed by grinding or the like to present a side surface that is smooth and flat.

The one or more shear stop members 16 may also be fixed to the rotatable supporting surface 12 using one or more fasteners, or by forming the one or more shear stop members 16 unitarily on the rotatable supporting surface 12, as mentioned above. Other methods for fixing the shear stop members 16 to the rotatable supporting surface 12 will be apparent to persons skilled in the art, all of which are comprehended by the present invention.

Figure 7:
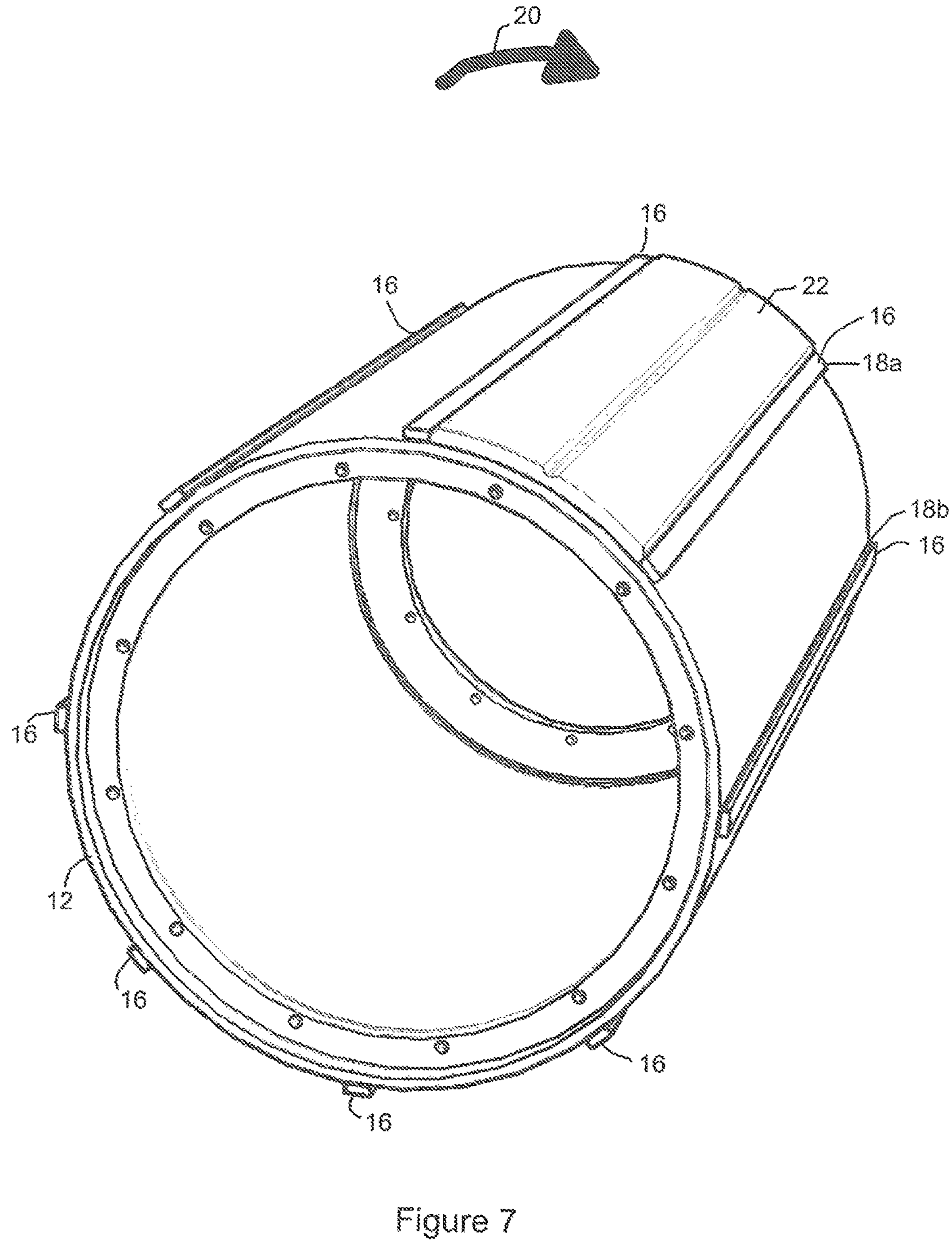
FIG. 7 is a perspective view of the conveyor roller surface arrangement of FIG. 3 with one lagging member bonded to the rotatable supporting surface between one of the plurality of shear stop members and the next one of the plurality of shear stop members around the circumference of the rotatable supporting surface.

With reference to FIG. 7, once the one or more shear stop members 16 (in this example eight shear stop members 16) are fixed to the rotatable supporting surface 12, the one or more lagging members 22 (in this example eight lagging members 22) may be bonded to the rotatable supporting surface 12 one at a time. Preferably, this is carried out by first sand blasting, grinding, or chemically cleaning (i.e. methyl ethyl ketone (MEK), Bryce Industries Inc., Mississauga, Ontario, Canada), the rotatable supporting surface 12 with the shear stop members 16. The purpose of this first step is to remove impurities which may result in no bonding or a weak bond 24. Next a primer coating is applied on the rotatable supporting surface 12 in the spaces 28, and preferably also on the lagging member abutting surfaces 18*a* and/or 18*b* of the shear stop members 16. Good results have been obtained using Chemlock® 205 primer from Lord Corporation, Cary, N.C., U.S.A. Next an adhesive coating is applied over the primer coating. Good results have been obtained using Chemlock® 220 adhesive, followed by an application of Chemlock® 286 adhesive, both from Lord Corporation, Cary, N.C., U.S.A. Preferably, a 1/16 inch sheet of calendared un-cured rubber (i.e. gum rubber) is next applied on the adhesive coating. Appropriately sized and shaped rubber lagging members 22 (i.e. ⅝ inch thick) are then applied on the layer of un-cured rubber. Preferably the rubber lagging members 22 are cleaned prior to being applied to the adhesive coating. In this regard, good results have been obtained by cleaning the rubber lagging members 22 with DS108® from Dysol Inc., Fort Worth, Tex., U.S.A. and treating them with Chemlok® 234B and Chemlock® 286 adhesive, prior to applying them to the un-cured rubber layer on the conveyor roller surface 12.

Figure 15A:
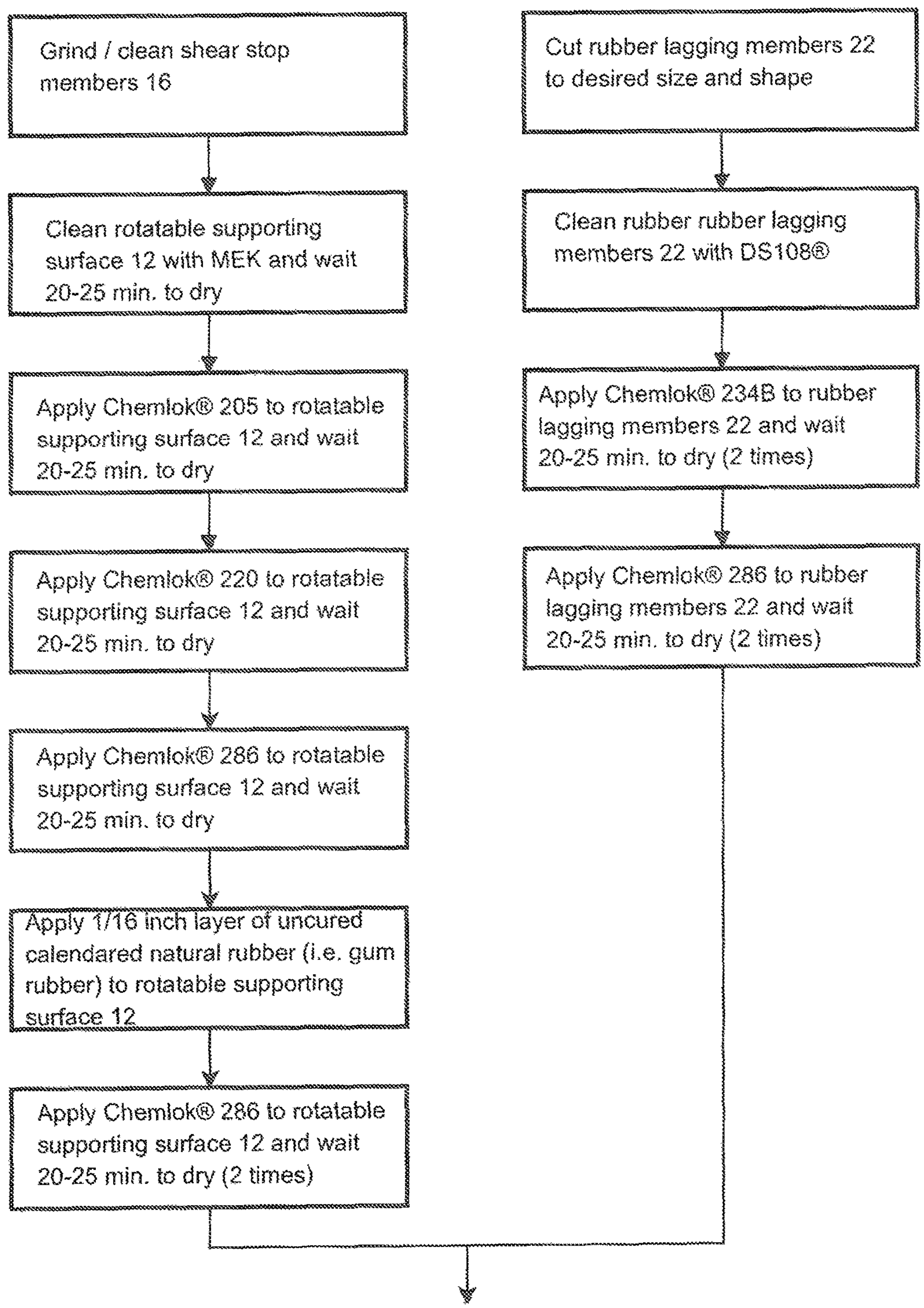
FIGS. 15*a* and 15*b* are a flow diagram showing the steps of a method of bonding lagging material to the rotatable supporting surface of FIG. 3 according to an embodiment of the present invention.
Figure 15B:
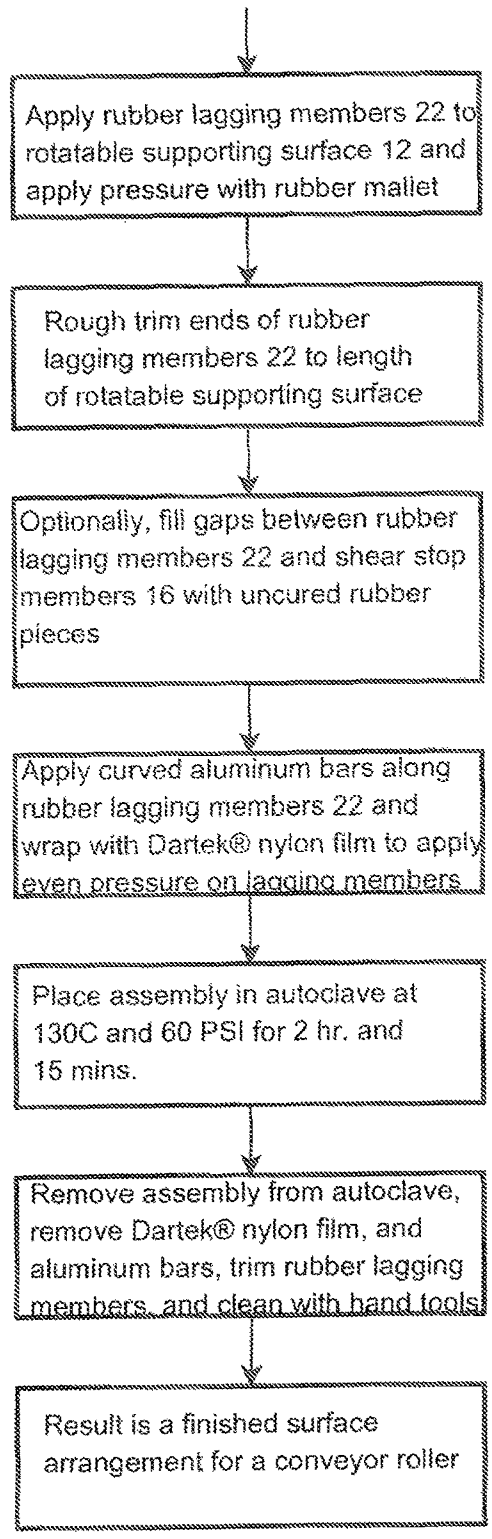

An example of the above method for bonding the lagging members 22 to the rotatable supporting surface 12 is illustrated in more detail in the flow diagram illustrated in FIGS. 15*a* and 15*b*.

Preferably, the lagging members 22 are positioned in the spaces 28 such that their ends 26*a* and/or 26*b* abut the lagging member abutting surfaces 18*a* and/or 18*b* of the shear stop members 16, as discussed above. Preferably, the thickness of the lagging members 22 will be sufficient to result in the conveyor medium engaging surfaces of the lagging members 22 being from 1/16 inch to 3/16 inch higher than the tops of the shear stop members 16. However, it is contemplated that it may be desirable to have the difference between the heights range from 0 inch (i.e. height of shear stop member is equal to height of conveyor medium engaging surface of the lagging member 22) to ¼ inch in other embodiments of the present invention. A high temperature tolerant fabric or film, such as for example, Dartek® nylon film available from Dupont Canada Inc., Mississauga, Ontario, Canada, may be tightly wrapped around the lagging members 22 to hold them in place on the rotatable supporting surface 12, and the assembly may then be inserted into an autoclave at high temperature and pressure to activate the adhesive and cure the rubber. In this regard, good results have been obtained by setting the autoclave to a temperature of 130° C., and pressure of 60 PSI. After a period of time has elapsed sufficient to activate the adhesive and cure the rubber, for example 2 hours and 15 minutes, the pressure in the autoclave may be released, the temperature gradually lowered, and the resulting conveyor roller surface arrangement 10 may be removed from the autoclave. Once removed from the autoclave, the high temperature film may be removed, and the cured rubber lagging members 22 may be trimmed as necessary. Preferably, a chemical bond is established between the lagging members 22 and the rotatable supporting surface 12, and the tensile strength of the bond 24 is between 400 pounds/inch$^2$ and 600 pounds/inch$^2$ at 68° F., and 275 pounds/inch$^2$ and 365 pounds/inch$^2$ at 212° F. Subsequently, the conveyor roller surface arrangement 10 thus formed, may be incorporated into a conveyor roller, such as a conveyor drive roller or a conveyor idler roller, for use in a conveyor system. It is also contemplated that the conveyor roller surface arrangement 10 may be made according to the above method with the rotatable supporting surface 12 already incorporated into a conveyor roller, provided that the conveyor roller is adapted to withstand the high temperatures and pressures of the autoclaving step. All such methods are comprehended by the present invention.

Figure 8:
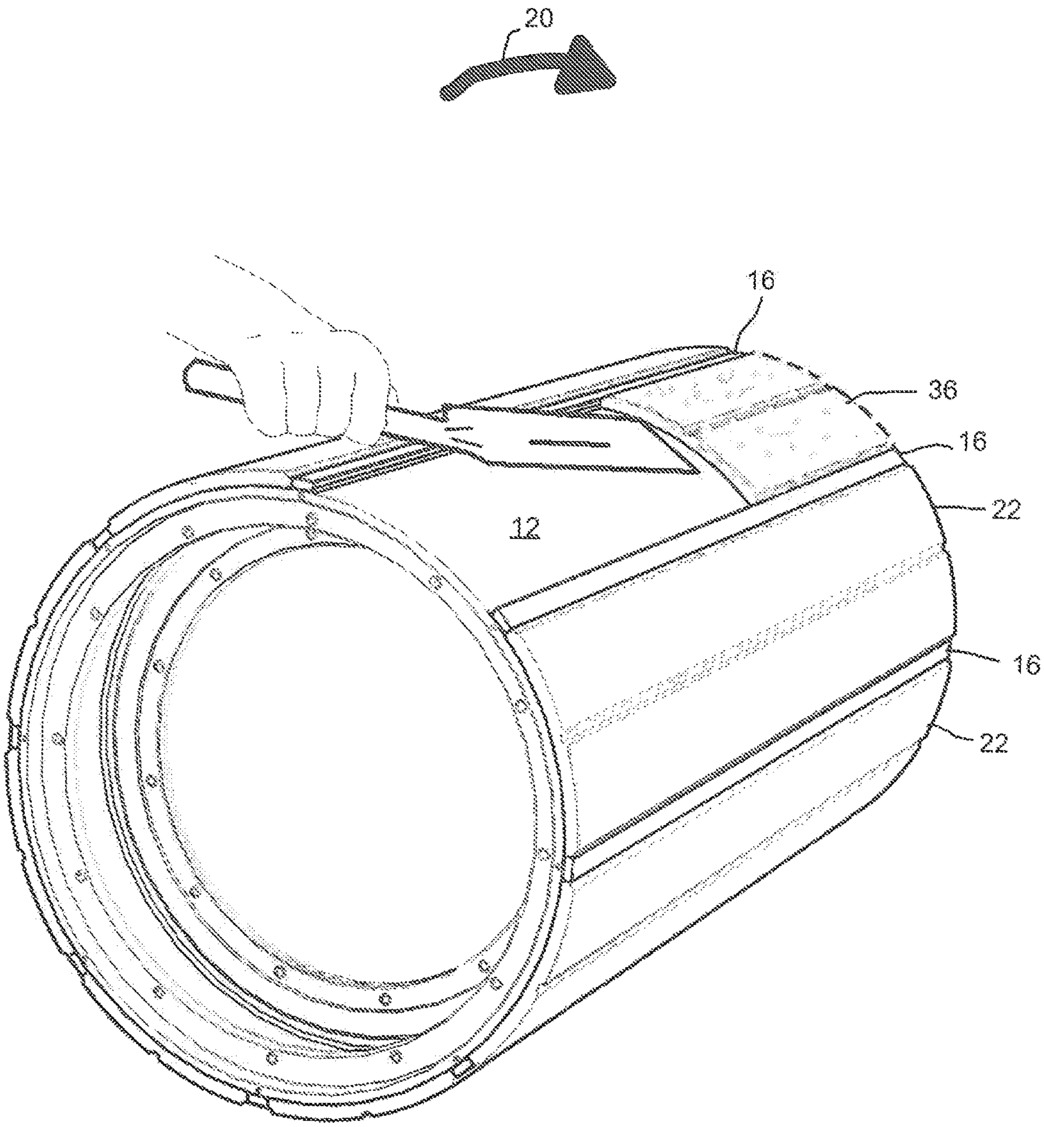
FIG. 8 is a perspective view of the conveyor roller surface arrangement of FIG. 1, showing a worn or damaged lagging member being removed from the rotatable surface.
Figure 9:
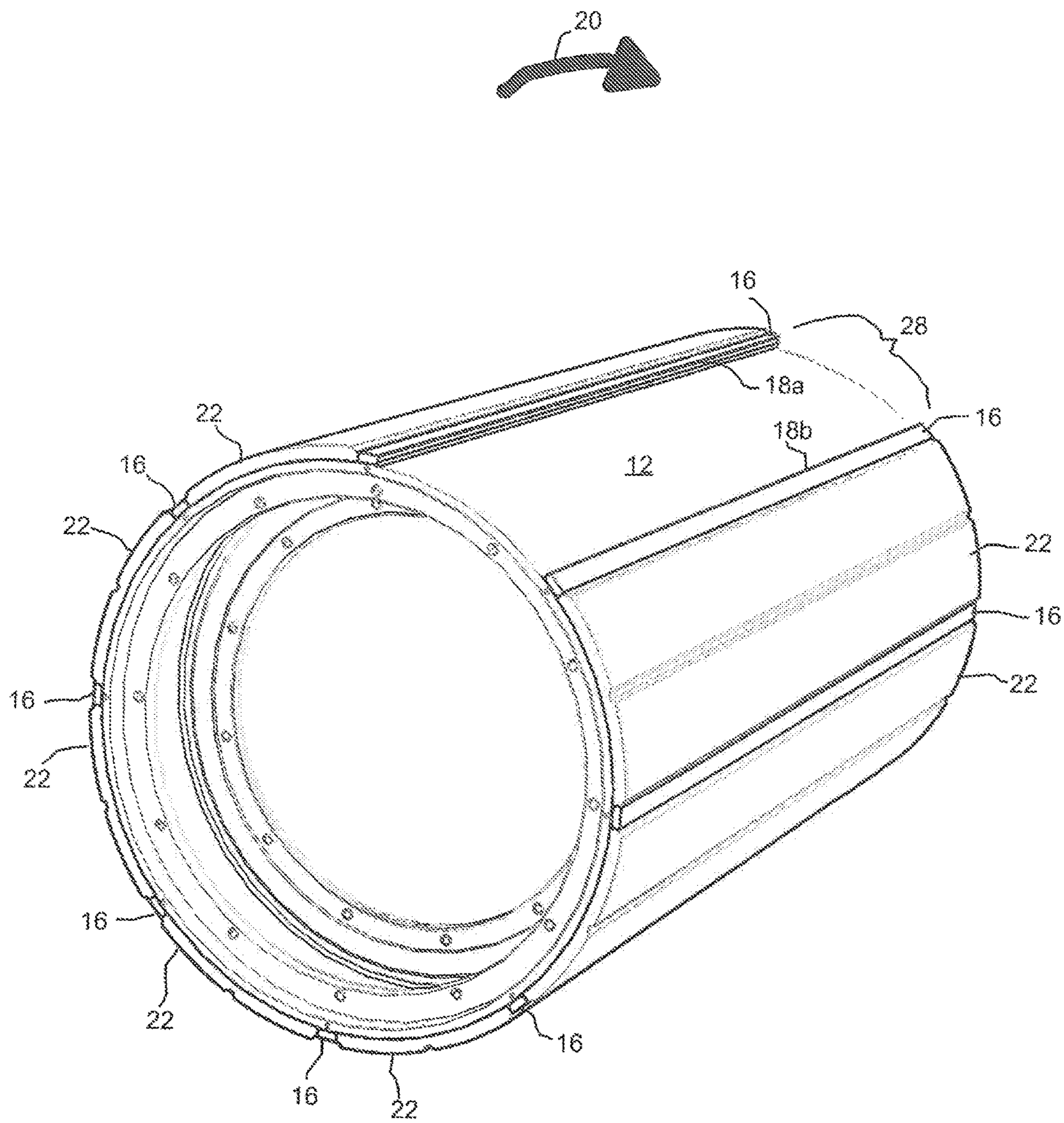
FIG. 9 is a perspective view of the conveyor roller surface arrangement of FIG. 8, showing the space uncovered after the worn or damaged lagging member has been removed from the rotatable surface.
Figure 10:
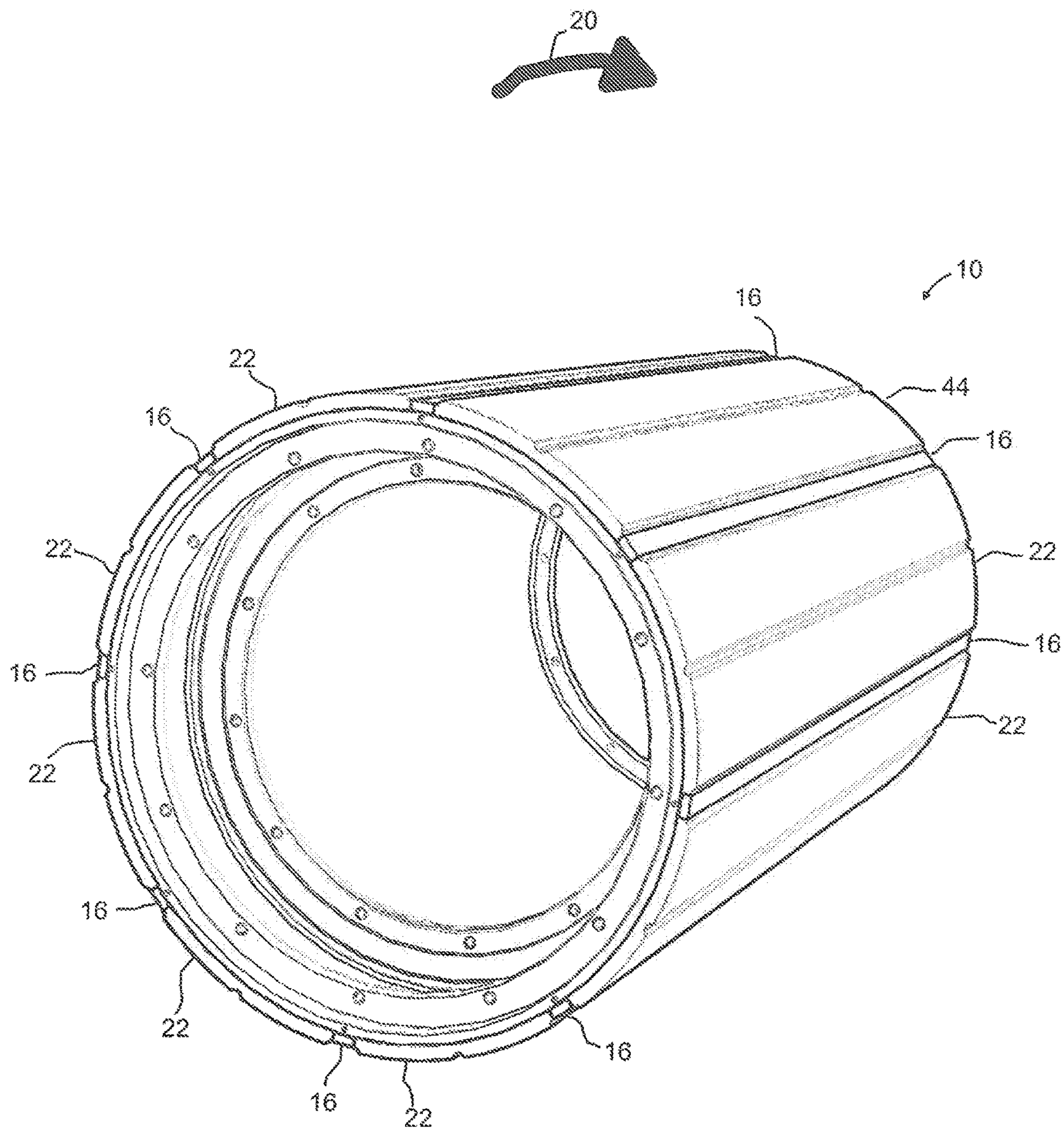
FIG. 10 is a perspective view of the conveyor roller surface arrangement of FIG. 8, after a replacement lagging member has been bonded to the rotatable surface in the space uncovered after removal of the worn or damaged lagging member.

With reference to FIGS. 8 to 10, the following describes a method of replacing a worn or damaged lagging member 36 bonded to a conveyor roller surface arrangement 10 according the present invention. The method may proceed without removing the conveyor roller surface arrangement 10 from the conveyor roller. However, it is contemplated that there may be instances where it will be preferable to remove the conveyor roller surface arrangement 10 from the conveyor roller to replace the worn or damaged lagging member 36, and reinstall the repaired conveyor roller surface arrangement 10 back on the conveyor roller.

Starting with FIG. 8, the rotatable supporting surface 12 has been removed from the conveyor roller, and a worn or damaged lagging member 36 is shown being removed from the rotatable supporting surface 12. As noted above, it may not be necessary to remove the rotatable supporting surface 12 from the conveyor roller. Removal of the worn or damaged lagging member 26 may be accomplished by for example scraping, peeling or pulling the worn or damaged lagging 36, or pieces thereof, from the rotatable supporting surface 12 until it has been completely removed from the space 28 between the two shear stop members 16 located on either side of the worn or damaged lagging member 36, as shown in FIG. 9. In some instances applying heat to the worn or damaged lagging member 36 may help to weaken the bond 24 between the worn or damaged lagging member 36 and said rotatable supporting surface 12. Once the worn or damaged lagging member 36 has been removed from the rotatable supporting surface 12, a replacement lagging member 44 may be provided, and positioned on the rotatable supporting surface 12 in the space 28 uncovered by the removal of the worn or damaged lagging member 36.

The above description of the lagging members 22 also applies to the replacement lagging members 44. For example, like the lagging members 22 discussed above, the replacement lagging member 44 may also be made from rubber (whether natural, synthetic, or blended), rubber-like material, urethane, silicone, or the like, and have a hardness from 45 shore to 65 shore. Similarly, the conveyor medium engaging surface of the replacement lagging member may be provided with a pattern or embedded with ceramic, etc.

Preferably, the replacement lagging member 44 may be bonded to the rotatable supporting surface 12 such that at least a portion of an end 26*a* and/or 26*b* of the replacement lagging member abuts at least a portion of the lagging member abutting surface 18*a* and/or 18*b* of the shear stop member 16, as discussed above.

The replacement lagging member 44 may be bonded to the rotatable supporting surface 12 in the same manner as described above for bonding a lagging member 22 to the rotatable supporting surface 12. In particular, to help ensure a good bond 24 between the replacement lagging member 44 and the rotatable supporting surface 12, the space 28 may be sand blasted, ground, or chemically cleaned cleaning (i.e. methyl ethyl ketone, Bryce Industries Inc., Mississauga, Ontario, Canada) prior to carrying out the bonding step. Next, a primer coating (i.e. Chemlock® 205 primer from Lord Corporation, Cary, N.C., U.S.A.) may be applied on the rotatable supporting surface 12 in the space 28, and on the lagging member abutting surfaces 18*a*, 18*b* of the shear stop members 16, followed by an adhesive coating being applied (i.e. Chemlock® 220 and Chemlock® 286 adhesives, from Lord Corporation, Cary, N.C., U.S.A.) over the primer coating. Preferably, a 1/16 inch sheet of calendared un-cured rubber (i.e. gum rubber) is next applied on the adhesive coating. An appropriately sized and shaped replacement rubber lagging member 44 (i.e. ⅝ inch thick) may then be applied on the un-cured rubber layer. Preferably the rubber replacement lagging member 22 is cleaned (i.e. methyl ethyl ketone, Bryce Industries Inc., Mississauga, Ontario, Canada) and treated with one or more adhesives (i.e. Chemlok® 234B and Chemlock® 286 adhesives, from Lord Corporation, Cary, N.C., U.S.A.) prior to being applied to the un-cured rubber layer on the rotatable supporting surface 12.

The replacement lagging member 44 may be sized and shaped to be the same as, or different from, the worn or damaged lagging member prior to becoming worn or damaged.

Preferably, the replacement lagging member 44 may be positioned in the space 28 such that its end 26*a* and/or 26*b* abuts the lagging member abutting surface 18*a* and/or 18*b* of the shear stop member 16, as discussed above. Preferably, the thickness of the replacement lagging member 44 will be sufficient to result in the conveyor medium engaging surface of the replacement lagging member 44 being from 1/16 inch to 3/16 inch higher than the tops of the shear stop members 16. However, it is contemplated that it may be desirable to have the difference between the heights range from 0 inch (i.e. height of shear stop member is equal to height of conveyor medium engaging surface of the replacement lagging member 44) to ¼ inch in other embodiments of the present invention. A high temperature tolerant fabric as (i.e.

Dartek® nylon film, Dupont Canada Inc., Mississauga, Ontario, Canada) may be tightly wrapped around the replacement lagging member 44 to hold it in place on the rotatable supporting surface 12, and the assembly may then be inserted into an autoclave at high temperature (i.e. 130° C.) and pressure (i.e. 60 PSI) to activate the adhesive and cure the rubber. After a period of time has elapsed sufficient to activate the adhesive and cure the rubber (i.e. 2 hours and 15 minutes), the pressure in the autoclave is released, the temperature is gradually lowered, and the resulting repaired conveyor roller surface arrangement 10 may be removed from the autoclave. Once removed from the autoclave, the high temperature film may be removed, and the cured replacement rubber lagging member 44 may be trimmed as necessary. Preferably, a chemical bond is established between the replacement lagging member 44 and the rotatable supporting surface 12, and the tensile strength of the bond 24 may be between 400 pounds/inch$^2$ and 600 pounds/inch$^2$ at 68° F., and 275 pounds/inch$^2$ and 365 pounds/inch$^2$ at 212° F. Subsequently, the conveyor roller surface arrangement 10 may be installed back onto the conveyor roller. However, it is also contemplated that the conveyor roller surface arrangement 10 may be repaired according to the above method without the conveyor roller surface arrangement 10 being removed from the conveyor roller, provided that the conveyor roller is adapted to withstand the high temperatures and pressures of the autoclaving step. All such methods for replacing a worn or damaged lagging member 36 are comprehended by the present invention.

The above described methods for bonding the lagging members 22 and replacement lagging members 44 involve forms of vulcanizing or hot bonding, it is also contemplated that other forms of bonding may be employed, including cold bonding, such as for example applying an adhesive to one or both of the lagging member 22 (or replacement lagging member 44), and the rotatable supporting surface, to stick the two together. Preferably, however, the bonding step may result in a bond 24 having a strength sufficient to overcome centrifugal force acting on the replacement lagging member, but less than a bond strength required to overcome the shear force without the replacement lagging member abutting a shear stop member 16, when the conveyor roller is in use. It is also preferable that the bonding step results in a bond 24 adapted to permit the replacement lagging member itself to be removed from the rotatable supporting surface and replaced.

Figure 11:
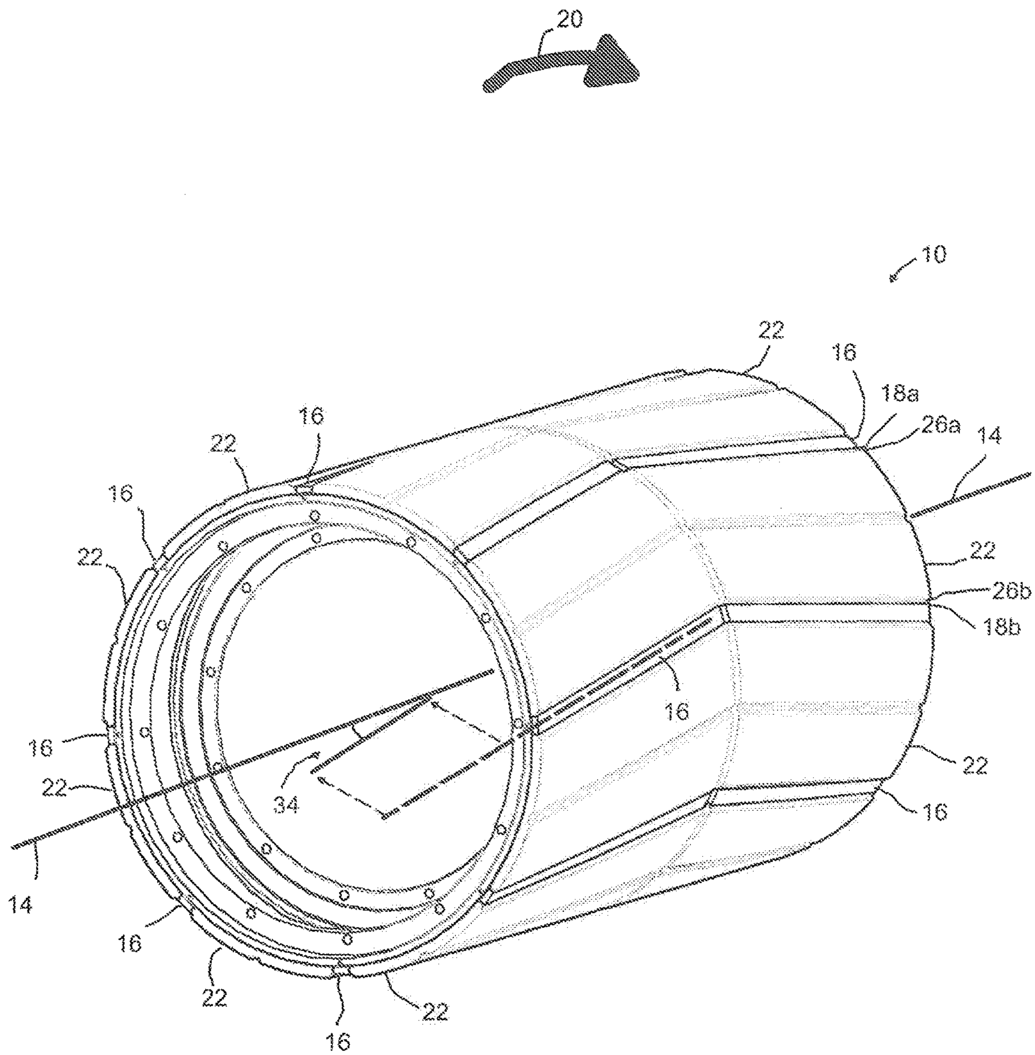
FIG. 11 is a perspective view of a conveyor roller surface arrangement according to another embodiment of the invention, showing a rotatable supporting surface, a plurality of shear stop members, and a plurality of lagging members.
Figure 12:
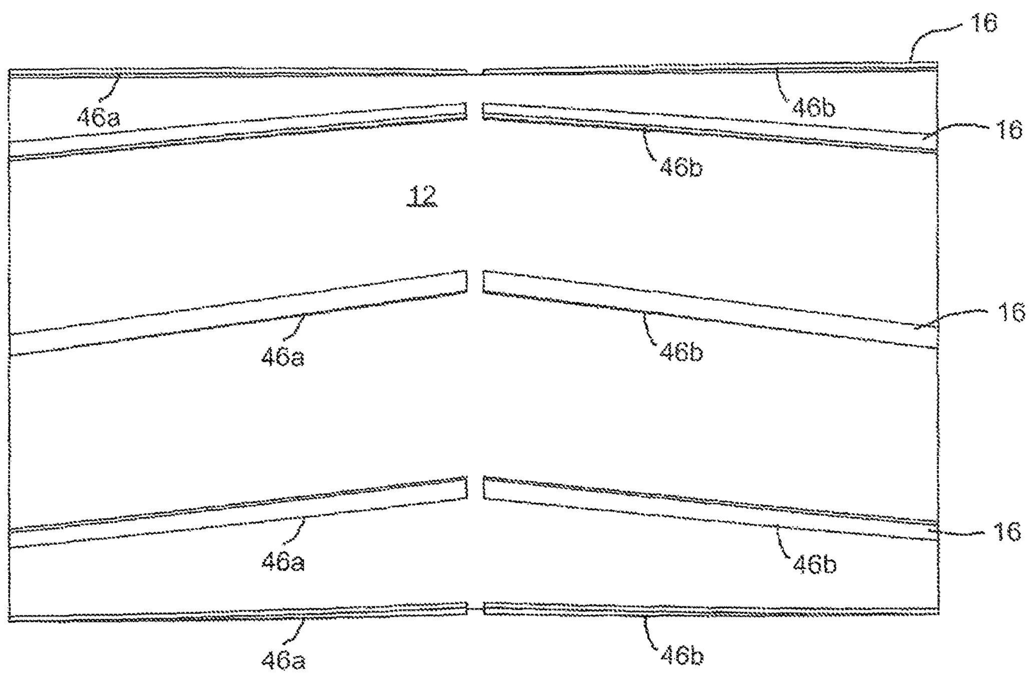
FIG. 12 is a front view of the conveyor roller surface arrangement of FIG. 11 without the lagging members bonded to the rotatable supporting surface to more clearly illustrate the plurality of shear stop members.
Figure 13:
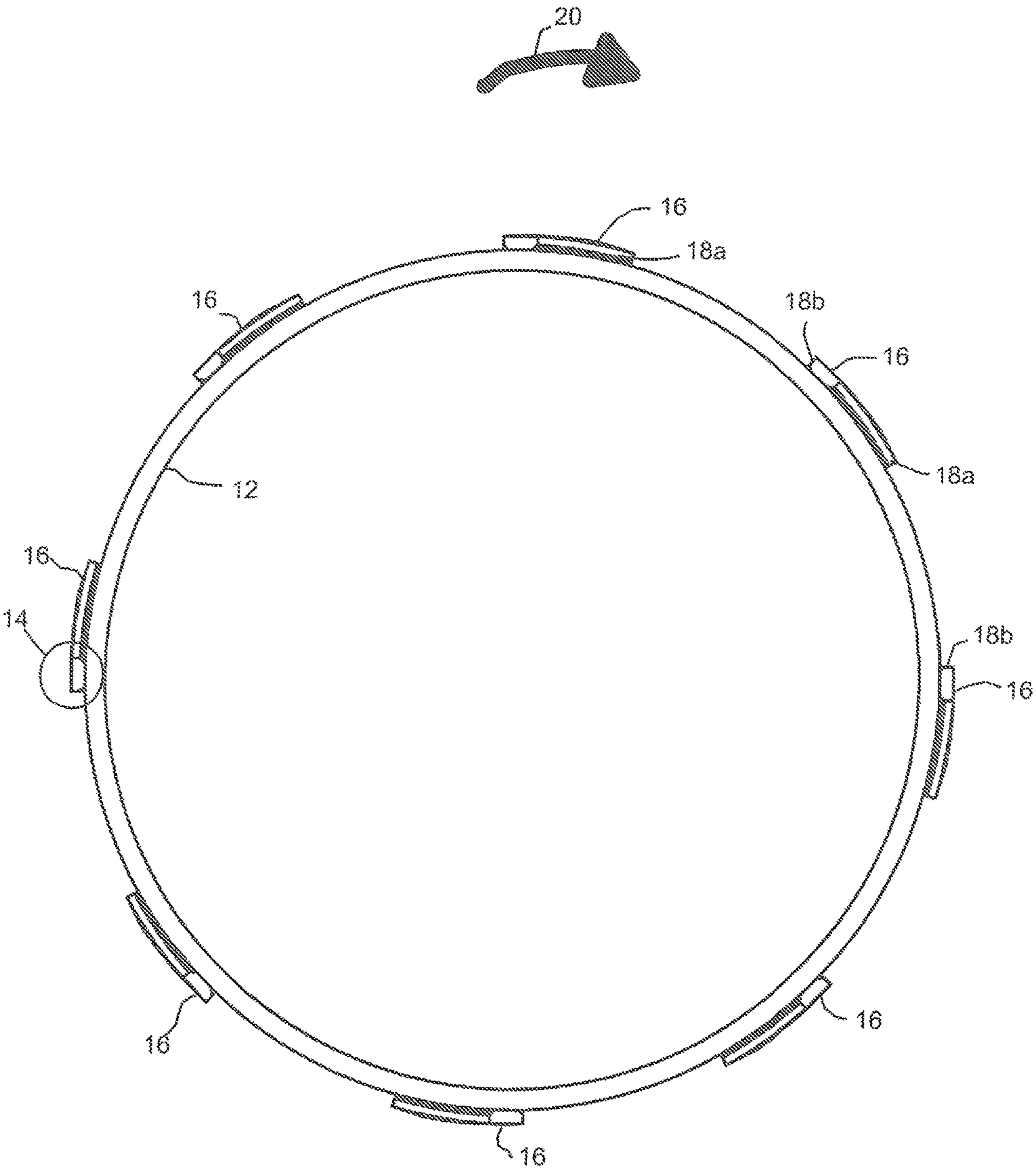
FIG. 13 is a side view of the conveyor roller surface arrangement of FIG. 11.
Figure 14:
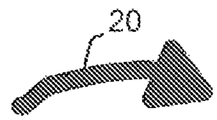
FIG. 14 is an enlarged side view of region 14 of FIG. 13, showing details of the shear stop member.
Figure 14:
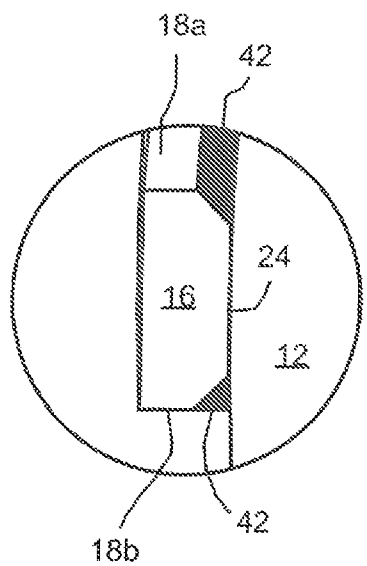

FIGS. 11 to 14 show a further embodiment of the present invention, in which the shear stop members 16, and/or their lagging member abutting surfaces 18*a* and/or 18*b* are oriented at an angle 34 relative to the axis of rotation 14. Preferably, the angle 34 may be from 0 degrees to 45 degrees. Additionally, the lagging member abutting surfaces 18*a* and/or 18*b* of the one or more shear stop members 16 may be oriented at a first angle relative to the axis of rotation followed by a second angle opposite to the first angle. As shown in FIG. 11, the shear stop members 16 may have a chevron-shape. Also, in contrast to the shear stop members 16 shown by way of example in FIGS. 1 to 10 which are formed as unitary members, the shear stop members may be formed as non-unitary members, for example formed from two or more separate members 46*a*, 46*b*. Furthermore, the two or more separate members 46*a*, 46*b* may be arranged on the rotatable supporting surface 12 to from a continuous, or a discontinuous non-unitary member. In this regard, FIGS. 11 to 14 illustrate an embodiment of the invention in which chevron-shaped shear stop members 16 are each formed as discontinuous, non-unitary members, from two separate members 46*a* and 46*b*.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A surface arrangement for a conveyor roller adapted for use in a conveyor system configured to support and move a conveyor medium, said surface arrangement comprising:

a rotatable supporting surface having a cylindrical shape, said rotatable supporting surface defining an axis of rotation;

at least one shear stop member fixed to and extending outwardly from said rotatable supporting surface;

at least one lagging member positioned on said rotatable supporting surface, with at least a portion of one end of said at least one lagging member abutting at least a portion of said at least one shear stop member; and a bond between said at least one lagging member and said rotatable supporting surface;

wherein said at least one shear stop member is adapted to resist movement of said at least one abutting lagging member in at least one direction along the circumference of said rotatable supporting surface to reduce a shear force exerted on said bond when said conveyor roller is in use.

2. The surface arrangement as claimed in claim 1, wherein said at least one shear stop member is fixed to said rotatable supporting surface by one or more fasteners, or welding.

3. The surface arrangement as claimed in claim 1, wherein said at least one shear stop member is formed unitarily with said rotatable supporting surface.

4. The surface arrangement as claimed in claim 1, wherein said at least one shear stop member is made of metal.

5. The surface arrangement as claimed in claim 1, wherein said bond comprises a hot bond or a cold bond.

6. The surface arrangement as claimed in claim 1, wherein said bond has a strength sufficient to overcome centrifugal force acting on said at least one lagging member, and said bond strength is less than a bond strength required to overcome said shear force without said at least one lagging member abutting said shear stop member, when said conveyor roller is in use.

7. The surface arrangement as claimed in claim 1, wherein said bond has a strength from 400 to 600 pounds/inch$^2$ at 68° F., or from 270 to 365 pounds/inch$^2$ at 212° F.

8. The surface arrangement as claimed in claim 1, wherein said bond is adapted to permit said at least one lagging member to be removed and replaced.

9. The surface arrangement as claimed in claim 1, wherein said at least one lagging member has a thickness which is greater than a thickness of said at least one shear stop member.

10. The surface arrangement as claimed in claim 1, wherein said at least one lagging member has a hardness from 45 shore to 65 shore.

11. The surface arrangement as claimed in claim 1, comprising a plurality of said shear stop members and a plurality of said lagging members, wherein at least a portion of one end of each of said plurality of lagging members abuts at least a portion of each respective one of said plurality of shear stop members.

12. The surface arrangement as claimed in claim 11, wherein said plurality of shear stop members are one of uniformly spaced apart from each other around the circumference of said rotatable supporting surface and non-uniformly spaced apart from each other around the circumference of said rotatable supporting surface.

13. The surface arrangement as claimed in claim 12, wherein at least one of said plurality of lagging members is sized and shaped to fill the space between one of said plurality of shear stop members and the next one of said plurality of shear stop members around the circumference of said rotatable supporting surface.

14. The surface arrangement as claimed in claim 12, wherein at least one of said plurality of lagging members is sized and shaped to not fill said space between one of said plurality of shear stop members and the next one of said plurality of shear stop members around the circumference of said rotatable supporting surface, to form a gap between said at least one lagging member and the next one of said plurality of shear stop members.

15. The surface arrangement as claimed in claim 1, wherein said at least one shear stop member defines a lagging member abutting surface oriented substantially parallel to said axis of rotation.

16. The surface arrangement as claimed in claim 1, wherein said at least one shear stop member defines a lagging member abutting surface oriented at an angle relative to said axis of rotation.

17. The surface arrangement as claimed in claim 16, wherein said angle is from 0 degrees to 45 degrees.

18. The surface arrangement as claimed in claim 1, wherein said at least one shear stop member defines a lagging member abutting surface oriented at a first angle relative to said axis of rotation followed by a second angle opposite to said first angle.

19. The surface arrangement as claimed in claim 18, wherein said lagging member abutting surface is a chevron-shape.

20. The surface arrangement as claimed in claim 1, wherein said at least one shear stop member is a unitary member.

21. The surface arrangement as claimed in claim 1, wherein said at least one shear stop member is a non-unitary member formed from two or more separate members.

22. The surface arrangement as claimed in claim 21, wherein said two or more separate members are arranged on said rotatable supporting surface to form one of a continuous member and a discontinuous non-unitary member.

23. The surface arrangement as claimed in claim 1, wherein said conveyor roller is a conveyor drive roller or a conveyor idler roller.

24. A method of replacing a worn or damaged lagging member bonded to the surface arrangement according to claim 1, said method of replacing said worn or damaged lagging member comprising the steps of:

removing from said rotatable supporting surface said worn or damaged lagging member abutting said at least one shear stop member;

providing a replacement lagging member;

positioning said replacement lagging member on said rotatable supporting surface, with at least a portion of one end of said replacement tagging member abutting at least a portion of said at least one shear stop member;

bonding said replacement lagging member to said rotatable supporting surface;

wherein said at least one shear stop member resists movement of said at least one abutting replacement lagging member in at least one direction along the circumference of said rotatable supporting surface to reduce a shear force exerted on said bond when said conveyor roller is in use.

25. The method as claimed in claim 24, wherein said bonding step comprises:

applying an adhesive to one or both of said at least one lagging member and said rotatable supporting surface; or vulcanizing said at least one lagging member to said rotatable supporting surface.

26. The method as claimed in claim 24, wherein said bonding step results in a bond having a strength sufficient to overcome centrifugal force acting on said replacement lagging member, and said bond strength is less than a bond strength required to overcome said shear force without said replacement lagging member abutting said at least one shear stop member, when said conveyor roller is in use.

27. The method as claimed in claim 24, wherein said bond has a strength from 400 to 600 pounds/inch$^2$ at 68° F., or 270 to 365 pounds inch$^2$ at 212° F.

28. The method as claimed in claim 24, wherein said bonding step results in a bond adapted to permit said replacement lagging member to be removed from said rotatable supporting surface and replaced.

29. The method as claimed in claim 24, wherein said replacement lagging member has a thickness which is greater than a thickness of said at least one shear stop member.

30. The method as claimed in claim 24, wherein said replacement lagging member has a hardness from 45 shore to 65 shore.

31. The method as claimed in claim 24, wherein said replacement lagging member is sized and shaped to be the same as said worn or damaged lagging member prior to becoming worn or damaged.

32. The method as claimed in claim 24, wherein said replacement lagging member is sized and shaped to be different from said worn or damaged lagging member prior to becoming worn or damaged.

33. The method as claimed in claim 24, wherein said removing step comprises one or more of:

a) applying heat to said worn or damaged lagging member to weaken said bond between said worn or damaged lagging member and said rotatable supporting surface;

b) peeling said worn or damaged lagging member from said rotatable supporting surface;

c) grinding said rotatable supporting surface;

d) sandblasting said rotatable supporting surface; and e) chemically cleaning said rotatable supporting surface.

34. The method as claimed in claim 24, wherein the step of providing at least one replacement lagging member comprises cutting a larger stock section to a desired size and shape for the at least one replacement lagging member.

* * * * *